United States Patent
Rusanovskyy et al.

(10) Patent No.: US 11,153,563 B2
(45) Date of Patent: Oct. 19, 2021

(54) COMBINED IN-LOOP FILTERS FOR VIDEO CODING

(71) Applicant: QUALCOMM Incorporated, San Diego, CA (US)

(72) Inventors: Dmytro Rusanovskyy, San Diego, CA (US); Kevin Pascal Andre Reuze, Voisins le bretonneux (FR); Marta Karczewicz, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/816,143

(22) Filed: Mar. 11, 2020

(65) Prior Publication Data

US 2020/0296364 A1    Sep. 17, 2020

Related U.S. Application Data

(60) Provisional application No. 62/817,412, filed on Mar. 12, 2019.

(51) Int. Cl.
*H04N 19/117* (2014.01)
*H04N 19/103* (2014.01)
*H04N 19/176* (2014.01)

(52) U.S. Cl.
CPC ......... *H04N 19/117* (2014.11); *H04N 19/103* (2014.11); *H04N 19/176* (2014.11)

(58) Field of Classification Search
USPC .................................................. 375/240.02
See application file for complete search history.

(56) References Cited

U.S. PATENT DOCUMENTS

| | | | |
|---|---|---|---|
| 2012/0200669 A1* | 8/2012 | Lai | H04N 19/597 348/43 |
| 2014/0376634 A1* | 12/2014 | Guo | H04N 19/513 375/240.16 |

(Continued)

FOREIGN PATENT DOCUMENTS

| | | | | |
|---|---|---|---|---|
| TW | 202023284 | * | 6/2020 | H04N 19/50 |

OTHER PUBLICATIONS

Chen J., et al., "Algorithm Description of Joint Exploration Test Model 1," 1, JVET Meeting, Oct. 19-21, 2015, Geneva;(The Joint Video Exploration Team of ISO/IEC JTC1/SC29/WG11 and ITU-T SG.16 ); URL: http://phenix.int-evry.fr/jvet/ ,, No. JVET-A1001 Feb. 24, 2016 (Feb. 24, 2016), XP030150000, 27 pages.

(Continued)

*Primary Examiner* — Behrooz M Senfi
(74) *Attorney, Agent, or Firm* — Pamela K. Soggu

(57) ABSTRACT

In general, techniques are described by which to obtain combined in-loop filters for video coding. A device for coding video data comprising a memory and one or more processors may be configured to perform the techniques. The memory may store the video data. The one or more processors, which may be implemented in circuitry, are configured to implement a combined sample adaptive offset and bilateral filter. The combined sample adaptive offset and bilateral filter may be configured to obtain reconstructed samples of a current block of the video data, and perform filtering with respect to the reconstructed samples of the current block of the video data to obtain filtered reconstructed samples of the current block of the video data.

26 Claims, 7 Drawing Sheets

(56) References Cited

U.S. PATENT DOCUMENTS

| | | | | |
|---|---|---|---|---|
| 2015/0071340 | A1* | 3/2015 | Andersson | H04N 19/463 |
| | | | | 375/240.02 |
| 2017/0006285 | A1* | 1/2017 | Lin | H04N 19/521 |
| 2017/0006299 | A1* | 1/2017 | Chiu | H04N 19/436 |
| 2018/0184127 | A1* | 6/2018 | Zhang | H04N 19/124 |
| 2020/0304816 | A1* | 9/2020 | Zhao | H04N 19/136 |
| 2020/0374541 | A1* | 11/2020 | Gao | H04N 19/176 |
| 2020/0396461 | A1* | 12/2020 | Zhao | H04N 19/117 |
| 2021/0120240 | A1* | 4/2021 | Bross | H04N 19/159 |

OTHER PUBLICATIONS

Chen J., et al., "Algorithm Description of Joint Exploration Test Model 4," Joint Video Exploration Team (JVET) of ITU-T SG 16 WP 3 and ISO/IEC JTC 1/SC 29/WG 11, 4th Meeting: Chengdu, Oct. 15-21, 2016, JVET-D1001-v3, 39 pp.

Chen J., et al., "Algorithm Description of Joint Exploration Test Model 3", Document: JVET-C1001_v3, Joint Video Exploration Team (JVET) of ITU-T SG 16 WP 3 and ISO/IEC JTC 1/SC 29/WG 11, 3rd Meeting: Geneva, CH, May 26-Jun. 1, 2016, 37 Pages.

Ergen S., "ZigBee/IEEE 802.15.4 Summary", Sep. 10, 2004, 37 Pages.

Fu C-M., et al., "Sample Adaptive Offset in the HEVC Standard", IEEE Transactions on Circuits and Systems for Video Technology, Institute of Electrical and Electronics Engineers, USA, Dec. 1, 2012, vol. 22, No. 12, pp. 1755-1764, XP011487153, ISSN: 1051-8215, DOI:10.1109/TCSVT.2012.2221529.

IEEE Std 802.11ad-2012: "Part 11: Wireless LAN Medium Access Control (MAC) and Physical Layer (PHY) Specifications—Amendment 3: Enhancements for Very High Throughput in the 60 GHz Band", LAN/MAN Standards Committee of the IEEE Computer Society, Dec. 28, 2012, 628 Pages.

"Information technology—Dynamic Adaptive Streaming over HTTP (Dash)—Part 1: Media Presentation Description and Segment Formats," ISO/IEC 23009-1, International Standard, Draft third edition, Jan. 9, 2017, 216 pp.

ITU-T H.265, Series H: Audiovisual and Multimedia Systems, Infrastructure of Audiovisual Services—Coding of Moving Video, High Efficiency Video Coding, The International Telecommunication Union, Jun. 2019, 696 Pages.

Kesireddy A., et al., "Adaptive Trilateral Filter for In-Loop Filtering," Computer Science & Information Technology (CS & IT), Jul. 12, 2014, pp. 35-41, XP055265968, DOI: 10.5121/csit.2014.4705 ISBN: 978-1-921987-20-5 the whole document.

Norkin A., et al., "HEVC Deblocking Filter", IEEE Transactions on Circuits and Systems for Video Technology, Dec. 1, 2012 (Dec. 1, 2012), vol. 22, No. 12, pp. 1746-1754, XP011487156.

Ohm J-R., et al., "MPEG-4 Advanced Video Coding", MPEG Doc#: N7314, Jul. 2005, 11 Pages.

Wang Y-K. et al., "High Efficiency Video Coding (HEVC) Defect Report", Joint Collaborative Team on Video Coding (JCT-VC) of ITU-T SG 16 WP 3 and ISO/IEC JTC 1/SC 29/WG 11, Doc. JCTVC-N1003_v1, 14th Meeting, Vienna, AT, Jul. 25-Aug. 2, 2013, 311 pages, please consider section 8.5.3.2.6 on p. 125, section 8.5.3.2.7 on pp. 126-129, and section 8.5.3.2.8 on pp. 129 and 130.

Chen Y., et al., "Description of SDR, HDR and 360 Degree Video Coding Technology Proposal by Qualcomm and Technicolor-Low and High Complexity Versions," JVET-J0021, 10th Meeting; San Diego, US, Apr. 10-20, 2018, (The Joint Video Exploration Team of ISO/IEC JTC1/SC29/WG11 and ITU-T SG.16); URL: http://phenix.int-evry.fr/jvet/, pp. 1-43.

* cited by examiner

COMBINED IN-LOOP FILTERS FOR VIDEO CODING

This application claims the benefit of U.S. Provisional Application No. 62/817,412, filed Mar. 12, 2019, the entire contents of which is hereby incorporated by reference as if set forth in its entirety.

TECHNICAL FIELD

This disclosure relates to video coding.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video compression techniques, such as those described in the standards defined by MPEG-2, MPEG-4, ITU-T H.263, ITU-T H.264/MPEG-4, Part 10, Advanced Video Coding (AVC), the ITU-T H.265, High Efficiency Video Coding (HEVC) standard, and extensions of such standards. The video devices may transmit, receive, encode, decode, and/or store digital video information more efficiently by implementing such video compression techniques.

Video compression techniques perform spatial (intra-picture) prediction and/or temporal (inter-picture) prediction to reduce or remove redundancy inherent in video sequences. For block-based video coding, a video slice (i.e., a video frame or a portion of a video frame) may be partitioned into video blocks, which may also be referred to as treeblocks, coding units (CUs) and/or coding nodes. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Spatial or temporal prediction results in a predictive block for a block to be coded. Residual data represents pixel differences between the original block to be coded and the predictive block. An inter-coded block is encoded according to a motion vector that points to a block of reference samples forming the predictive block, and the residual data indicating the difference between the coded block and the predictive block. An intra-coded block is encoded according to an intra-coding mode and the residual data. For further compression, the residual data may be transformed from the pixel domain to a transform domain, resulting in residual transform coefficients, which then may be quantized.

SUMMARY

In general, this disclosure describes filtering techniques that may be used in a post-processing stage, as part of in-loop coding, or in a prediction stage of video coding. The filtering techniques of this disclosure may be applied to existing video codecs, such as High Efficiency Video Coding (HEVC), or be an efficient coding tool in any future video coding standards. The filtering techniques described in this disclosure may enable harmonization between a sample adaptive offset filter and a bilateral filter, whereby the sample adaptive offset (SAO) filter may be modified to incorporate the bilateral filter. The harmonization of the SAO filter and the bilateral filter may improve coding efficiency (in terms of a number of processor cycles required to perform bilateral filtering, memory and memory bandwidth utilization—as a single buffer and/or read may be needed for both sample adaptive offset filtering and/or bilateral filtering, and the like).

In one example, various aspects of the techniques are directed to a method of filtering a reconstructed block of video data, the method comprising: obtaining, by one or more processors configured to implement a sample adaptive offset filter, reconstructed samples of a current block of the video data; and performing, by the combined sample adaptive offset and bilateral filter, filtering with respect to the reconstructed samples of the current block of the video data to obtain filtered reconstructed samples of the current block of the video data.

In another example, various aspects of the techniques are directed to a device for coding video data, the device comprising: a memory to store the video data; and one or more processors implemented in circuitry, the one or more processors configured to implement a combined sample adaptive offset and bilateral filter, the combined sample adaptive offset and bilateral filter configured to: obtain reconstructed samples of a current block of the video data; and perform filtering with respect to the reconstructed samples of the current block of the video data to obtain filtered reconstructed samples of the current block of the video data.

In another example, various aspects of the techniques are directed to a computer-readable storage medium having stored thereon instructions that, when executed, cause one or more processors to implement a combined sample adaptive offset and bilateral filter, wherein the combined sample adaptive offset and bilateral filter is configured to: obtain reconstructed samples of a current block of video data; and perform filtering with respect to the reconstructed samples of the current block of the video data to obtain filtered reconstructed samples of the current block of the video data.

In another example, various aspects of the techniques are directed to a device for coding video data, the device comprising: means for implementing a combined sample adaptive offset and bilateral filter, wherein the means for implementing the sample adaptive offset and bilateral filter comprises: means for obtaining reconstructed samples of a current block of the video data; and means for performing filtering with respect to the reconstructed samples of the current block of the video data to obtain filtered reconstructed samples of the current block of the video data.

The details of one or more aspects of the disclosure are set forth in the accompanying drawings and the description below. Other features, objects, and advantages of the techniques described in this disclosure will be apparent from the description, drawings, and claims.

DETAILED DESCRIPTION

Video coders (e.g., video encoders and video decoders) may perform various filtering operations on video data. For instance, to preserve edges and reduce noise, a video decoder may perform bilateral filtering on a sample of video data by replacing the sample with a weighted average of the sample and the neighboring samples.

It may be generally desirable for a video coder (which may refer a video encoder, a video decoder or both a video encoder and a video decoder) to be able to process multiple blocks of video data in parallel. For instance, a video decoder may reconstruct and filter the samples of several blocks of video data at the same time. By processing multiple blocks of video data in parallel, a video coder may reduce the amount of time required to decode pictures of video data.

Although blocks may be processed in parallel, the video coder may apply multiple different in-loop filters independent from one another. In other words, each of the multiple different in-loop filters may include separate parameters that control application of the different in-loop filters, thereby potentially consuming excessive bits in terms of signaling such parameters in a bitstream, which may result in less bits available to define actual video data and thereby potentially degrade video quality.

In accordance with one or more techniques of this disclosure, a video coder may harmonize application of multiple different in-loop filters by adapting a first in-loop filter (e.g., a sample adaptive offset filter) to perform a second in-loop filter (e.g., a bilateral filter), thereby producing a combined in-loop filter (e.g., a combined sample adaptive offset and bilateral filter). In this respect, the techniques may improve operation of the video coder itself in terms of consolidating in-loop filters, thereby potentially improving coding efficiency (in terms of a number of processor cycles required to perform bilateral filtering, memory and memory bandwidth utilization—as a single buffer and/or read/write may be needed for both sample adaptive offset filtering and/or bilateral filtering, and the like).

Figure 1:
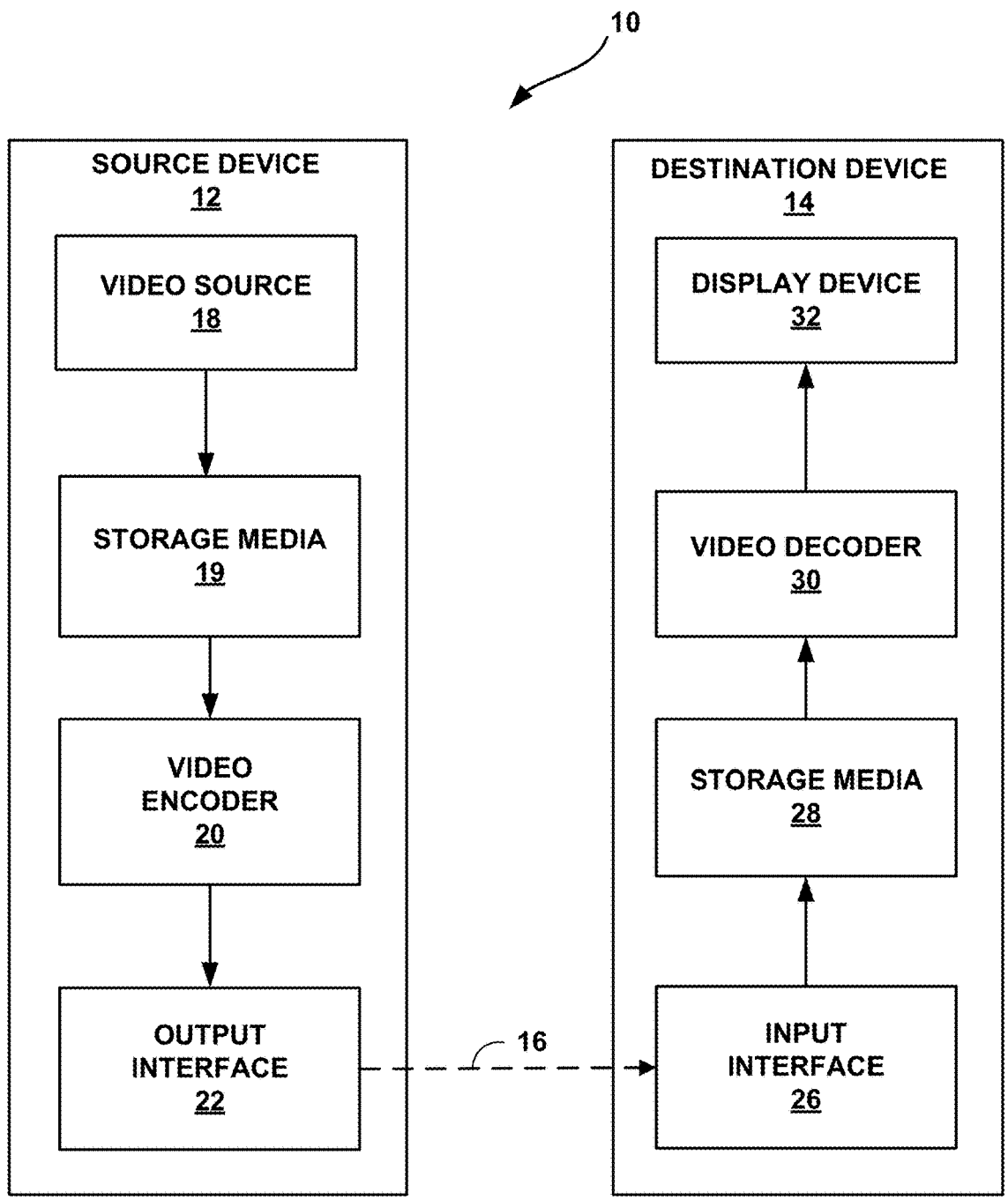
FIG. 1 is a block diagram illustrating an example video encoding and decoding system that may utilize one or more techniques described in this disclosure.

FIG. 1 is a block diagram illustrating an example video encoding and decoding system 10 that may utilize techniques of this disclosure. As shown in FIG. 1, system 10 includes a source device 12 that provides encoded video data to be decoded at a later time by a destination device 14. In particular, source device 12 provides the video data to destination device 14 via a computer-readable medium 16. Source device 12 and destination device 14 may comprise any of a wide range of devices, including desktop computers, notebook (i.e., laptop) computers, tablet computers, set-top boxes, telephone handsets such as so-called "smart" phones, tablet computers, televisions, cameras, display devices, digital media players, video gaming consoles, video streaming device, or the like. In some cases, source device 12 and destination device 14 may be equipped for wireless communication. Thus, source device 12 and destination device 14 may be wireless communication devices. Source device 12 is an example video encoding device (i.e., a device for encoding video data). Destination device 14 is an example video decoding device (i.e., a device for decoding video data).

In the example of FIG. 1, source device 12 includes a video source 18, storage media 19 configured to store video data, a video encoder 20, and an output interface 22. Destination device 14 includes an input interface 26, a storage media 28 configured to store encoded video data, a video decoder 30, and display device 32. In other examples, source device 12 and destination device 14 include other components or arrangements. For example, source device 12 may receive video data from an external video source, such as an external camera. Likewise, destination device 14 may interface with an external display device, rather than including an integrated display device.

The illustrated system 10 of FIG. 1 is merely one example. Techniques for processing video data may be performed by any digital video encoding and/or decoding device. Although generally the techniques of this disclosure are performed by a video encoding device, the techniques may also be performed by a video encoder/decoder, typically referred to as a "CODEC." Source device 12 and destination device 14 are merely examples of such coding devices in which source device 12 generates coded video data for transmission to destination device 14. In some examples, source device 12 and destination device 14 may operate in a substantially symmetrical manner such that each of source device 12 and destination device 14 include video encoding and decoding components. Hence, system 10 may support one-way or two-way video transmission between source device 12 and destination device 14, e.g., for video streaming, video playback, video broadcasting, or video telephony.

Video source 18 of source device 12 may include a video capture device, such as a video camera, a video archive containing previously captured video, and/or a video feed interface to receive video data from a video content provider. As a further alternative, video source 18 may generate computer graphics-based data as the source video, or a combination of live video, archived video, and computer-generated video. Source device 12 may comprise one or more data storage media (e.g., storage media 19) configured to store the video data. The techniques described in this disclosure may be applicable to video coding in general, and may be applied to wireless and/or wired applications. In each case, the captured, pre-captured, or computer-generated video may be encoded by video encoder 20. Output interface 22 may output the encoded video information to a computer-readable medium 16.

Output interface 22 may comprise various types of components or devices. For example, output interface 22 may comprise a wireless transmitter, a modem, a wired networking component (e.g., an Ethernet card), or another physical component. In examples where output interface 22 comprises a wireless receiver, output interface 22 may be configured to receive data, such as the bitstream, modulated according to a cellular communication standard, such as 4G, 4G-LTE, LTE Advanced, 5G, and the like. In some examples where output interface 22 comprises a wireless receiver, output interface 22 may be configured to receive data, such as the bitstream, modulated according to other wireless standards, such as an IEEE 802.11 specification, an IEEE 802.15 specification (e.g., ZigBee™), a Bluetooth™ standard, and the like. In some examples, circuitry of output interface 22 may be integrated into circuitry of video encoder 20 and/or other components of source device 12. For example, video encoder 20 and output interface 22 may be parts of a system on a chip (SoC). The SoC may also include other components, such as a general purpose microprocessor, a graphics processing unit, and so on.

Destination device 14 may receive the encoded video data to be decoded via computer-readable medium 16. Computer-readable medium 16 may comprise any type of medium or device capable of moving the encoded video data from source device 12 to destination device 14. In some examples, computer-readable medium 16 comprises a communication medium to enable source device 12 to transmit encoded video data directly to destination device 14 in real-time. The encoded video data may be modulated according to a communication standard, such as a wireless communication protocol, and transmitted to destination device 14. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 12 to destination device 14. Destination device 14 may comprise one or more data storage media configured to store encoded video data and decoded video data.

In some examples, encoded data may be output from output interface 22 to a storage device. Similarly, encoded data may be accessed from the storage device by input interface. The storage device may include any of a variety of distributed or locally accessed data storage media such as a hard drive, Blu-ray discs, DVDs, CD-ROMs, flash memory, volatile or non-volatile memory, or any other suitable digital storage media for storing encoded video data. In a further example, the storage device may correspond to a file server or another intermediate storage device that may store the encoded video generated by source device 12. Destination device 14 may access stored video data from the storage device via streaming or download. The file server may be any type of server capable of storing encoded video data and transmitting that encoded video data to the destination device 14. Example file servers include a web server (e.g., for a website), an FTP server, network attached storage (NAS) devices, or a local disk drive. Destination device 14 may access the encoded video data through any standard data connection, including an Internet connection. This may include a wireless channel (e.g., a Wi-Fi connection), a wired connection (e.g., DSL, cable modem, etc.), or a combination of both that is suitable for accessing encoded video data stored on a file server. The transmission of encoded video data from the storage device may be a streaming transmission, a download transmission, or a combination thereof.

The techniques may be applied to video coding in support of any of a variety of multimedia applications, such as over-the-air television broadcasts, cable television transmissions, satellite television transmissions, Internet streaming video transmissions, such as dynamic adaptive streaming over HTTP (DASH), digital video that is encoded onto a data storage medium, decoding of digital video stored on a data storage medium, or other applications. In some examples, system 10 may be configured to support one-way or two-way video transmission to support applications such as video streaming, video playback, video broadcasting, and/or video telephony.

Computer-readable medium 16 may include transient media, such as a wireless broadcast or wired network transmission, or storage media (that is, non-transitory storage media), such as a hard disk, flash drive, compact disc, digital video disc, Blu-ray disc, or other computer-readable media. In some examples, a network server (not shown) may receive encoded video data from source device 12 and provide the encoded video data to destination device 14, e.g., via network transmission. Similarly, a computing device of a medium production facility, such as a disc stamping facility, may receive encoded video data from source device 12 and produce a disc containing the encoded video data. Therefore, computer-readable medium 16 may be understood to include one or more computer-readable media of various forms, in various examples.

Input interface 26 of destination device 14 receives information from computer-readable medium 16. The information of computer-readable medium 16 may include syntax information defined by video encoder 20 of video encoder 20, which is also used by video decoder 30, that includes syntax elements that describe characteristics and/or processing of blocks and other coded units, e.g., groups of pictures (GOPs). Input interface 26 may comprise various types of components or devices. For example, input interface 26 may comprise a wireless receiver, a modem, a wired networking component (e.g., an Ethernet card), or another physical component. In examples where input interface 26 comprises a wireless receiver, input interface 26 may be configured to receive data, such as the bitstream, modulated according to a cellular communication standard, such as 4G, 4G-LTE, LTE Advanced, 5G, and the like. In some examples where input interface 26 comprises a wireless receiver, input interface 26 may be configured to receive data, such as the bitstream, modulated according to other wireless standards, such as an IEEE 802.11 specification, an IEEE 802.15 specification (e.g., ZigBee™), a Bluetooth™ standard, and the like. In some examples, circuitry of input interface 26 may be integrated into circuitry of video decoder 30 and/or other components of destination device 14. For example, video decoder 30 and input interface 26 may be parts of a SoC. The SoC may also include other components, such as a general purpose microprocessor, a graphics processing unit, and so on.

Storage media 28 may be configured to store encoded video data, such as encoded video data (e.g., a bitstream) received by input interface 26. Display device 32 displays the decoded video data to a user, and may comprise any of a variety of display devices such as a cathode ray tube (CRT), a liquid crystal display (LCD), a plasma display, an organic light emitting diode (OLED) display, or another type of display device.

Video encoder 20 and video decoder unit 30 each may be implemented as any of a variety of suitable encoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of video encoder 20 and video decoder 30 may be included in one or more encoders or decoders, either of which may be integrated as part of a combined encoder/decoder (CODEC) in a respective device.

In some examples, video encoder 20 and video decoder 30 may operate according to a video coding standard such as an existing or future standard. Example video coding standards include, but are not limited to, ITU-T H.261, ISO/IEC MPEG-1 Visual, ITU-T H.262 or ISO/IEC MPEG-2 Visual, ITU-T H.263, ISO/IEC MPEG-4 Visual and ITU-T H.264 (also known as ISO/IEC MPEG-4 AVC), including its Scalable Video Coding (SVC) and Multi-View Video Coding (MVC) extensions. In addition, a new video coding standard, namely High Efficiency Video Coding (HEVC) or ITU-T H.265, including its range and screen content coding extensions, 3D video coding (3D-HEVC) and multiview extensions (MV-HEVC) and scalable extension (SHVC), has been developed by the Joint Collaboration Team on Video Coding (JCT-VC) as well as Joint Collaboration Team on 3D Video Coding Extension Development (JCT-3V) of ITU-T Video Coding Experts Group (VCEG) and ISO/IEC Motion Picture Experts Group (MPEG). Ye-Kui Wang et al., "High Efficiency Video Coding (HEVC) Defect Report," Joint Collaborative Team on Video Coding (JCT-VC) of ITU-T SG 16 WP 3 and ISO/IEC JTC 1/SC 29/WG 11, 14$^{th}$ Meeting, Vienna, AT, 25 Jul.-2 Aug. 2013, document JCTVC-N1003_v1, is a draft HEVC specification.

ITU-T VCEG (Q6/16) and ISO/IEC MPEG (JTC 1/SC 29/WG 11) are now studying the potential need for standardization of future video coding technology with a compression capability that significantly exceeds that of the current HEVC standard (including its current extensions and near-term extensions for screen content coding and high-dynamic-range coding). The groups are working together on this exploration activity in a joint collaboration effort known as the Joint Video Exploration Team (JVET) to evaluate compression technology designs proposed by their experts in this area. The JVET first met during 19-21 Oct. 2015. Jianle Chen et al., "Algorithm Description of Joint Exploration Test Model 3," Joint Video Exploration Team (JVET) of ITU-T SG 16 WP 3 and ISO/IEC JTC 1/SC 29/WG 11, 3$^{rd}$ Meeting, Geneva, CH, 26 May-1 Jun. 2016, document JVET-C1001, is an algorithm description of Joint Exploration Test Model 3 (JEM3).

In HEVC and other video coding specifications, video data includes a series of pictures. Pictures may also be referred to as "frames." A picture may include one or more sample arrays. Each respective sample array of a picture may comprise an array of samples for a respective color component. In HEVC, a picture may include three sample arrays, denoted $S_L$, $S_{Cb}$, and $S_{Cr}$. $S_L$ is a two-dimensional array (i.e., a block) of luma samples. $S_{Cb}$ is a two-dimensional array of Cb chroma samples. $S_{Cr}$ is a two-dimensional array of Cr chroma samples. In other instances, a picture may be monochrome and may only include an array of luma samples.

As part of encoding video data, video encoder 20 may encode pictures of the video data. In other words, video encoder 20 may generate encoded representations of the pictures of the video data. An encoded representation of a picture may be referred to herein as a "coded picture" or an "encoded picture."

To generate an encoded representation of a picture, video encoder 20 may encode blocks of the picture. Video encoder 20 may include, in a bitstream, an encoded representation of the video block. For example, to generate an encoded representation of a picture, video encoder 20 may partition each sample array of the picture into coding tree blocks (CTBs) and encode the CTBs. A CTB may be an N×N block of samples in a sample array of a picture. In the HEVC main profile, the size of a CTB can range from 16×16 to 64×64, although technically 8×8 CTB sizes can be supported.

A coding tree unit (CTU) of a picture may comprise one or more CTBs and may comprise syntax structures used to encode the samples of the one or more CTBs. For instance, each a CTU may comprise a CTB of luma samples, two corresponding CTBs of chroma samples, and syntax structures used to encode the samples of the CTBs. In monochrome pictures or pictures having three separate color planes, a CTU may comprise a single CTB and syntax structures used to encode the samples of the CTB. A CTU may also be referred to as a "tree block" or a "largest coding unit" (LCU). In this disclosure, a "syntax structure" may be defined as zero or more syntax elements present together in a bitstream in a specified order. In some codecs, an encoded picture is an encoded representation containing all CTUs of the picture.

To encode a CTU of a picture, video encoder 20 may partition the CTBs of the CTU into one or more coding blocks. A coding block is an N×N block of samples. In some codecs, to encode a CTU of a picture, video encoder 20 may recursively perform quad-tree partitioning on the coding tree blocks of a CTU to partition the CTBs into coding blocks, hence the name "coding tree units." A coding unit (CU) may comprise one or more coding blocks and syntax structures used to encode samples of the one or more coding blocks. For example, a CU may comprise a coding block of luma samples and two corresponding coding blocks of chroma samples of a picture that has a luma sample array, a Cb sample array, and a Cr sample array, and syntax structures used to encode the samples of the coding blocks. In monochrome pictures or pictures having three separate color planes, a CU may comprise a single coding block and syntax structures used to code the samples of the coding block.

Furthermore, video encoder 20 may encode CUs of a picture of the video data. In some codecs, as part of encoding a CU, video encoder 20 may partition a coding block of the CU into one or more prediction blocks. A prediction block is a rectangular (i.e., square or non-square) block of samples on which the same prediction is applied. A prediction unit (PU) of a CU may comprise one or more prediction blocks of a CU and syntax structures used to predict the one or more prediction blocks. For example, a PU may comprise a prediction block of luma samples, two corresponding prediction blocks of chroma samples, and syntax structures used to predict the prediction blocks. In monochrome pictures or pictures having three separate color planes, a PU may comprise a single prediction block and syntax structures used to predict the prediction block.

Video encoder 20 may generate a predictive block (e.g., a luma, Cb, and Cr predictive block) for a prediction block (e.g., luma, Cb, and Cr prediction block) of a CU. Video encoder 20 may use intra prediction or inter prediction to generate a predictive block. If video encoder 20 uses intra prediction to generate a predictive block, video encoder 20 may generate the predictive block based on decoded samples of the picture that includes the CU. If video encoder 20 uses inter prediction to generate a predictive block of a CU of a current picture, video encoder 20 may generate the predictive block of the CU based on decoded samples of a reference picture (i.e., a picture other than the current picture).

Video encoder 20 may generate one or more residual blocks for the CU. For instance, video encoder 20 may generate a luma residual block for the CU. Each sample in the CU's luma residual block indicates a difference between a luma sample in one of the CU's predictive luma blocks and a corresponding sample in the CU's original luma coding block. In addition, video encoder 20 may generate a Cb residual block for the CU. Each sample in the Cb residual block of a CU may indicate a difference between a Cb sample in one of the CU's predictive Cb blocks and a corresponding sample in the CU's original Cb coding block. Video encoder 20 may also generate a Cr residual block for the CU. Each sample in the CU's Cr residual block may indicate a difference between a Cr sample in one of the CU's predictive Cr blocks and a corresponding sample in the CU's original Cr coding block.

Furthermore, video encoder 20 may decompose the residual blocks of a CU into one or more transform blocks. For instance, video encoder 20 may use quad-tree partitioning to decompose the residual blocks of a CU into one or more transform blocks. A transform block is a rectangular (e.g., square or non-square) block of samples on which the same transform is applied. A transform unit (TU) of a CU may comprise one or more transform blocks. For example, a TU may comprise a transform block of luma samples, two corresponding transform blocks of chroma samples, and syntax structures used to transform the transform block samples. Thus, each TU of a CU may have a luma transform block, a Cb transform block, and a Cr transform block. The luma transform block of the TU may be a sub-block of the CU's luma residual block. The Cb transform block may be a sub-block of the CU's Cb residual block. The Cr transform block may be a sub-block of the CU's Cr residual block. In monochrome pictures or pictures having three separate color planes, a TU may comprise a single transform block and syntax structures used to transform the samples of the transform block.

Video encoder 20 may apply one or more transforms a transform block of a TU to generate a coefficient block for the TU. A coefficient block may be a two-dimensional array of transform coefficients. A transform coefficient may be a scalar quantity. In some examples, the one or more transforms convert the transform block from a pixel domain to a frequency domain. Thus, in such examples, a transform coefficient may be a scalar quantity considered to be in a frequency domain. A transform coefficient level is an integer quantity representing a value associated with a particular 2-dimensional frequency index in a decoding process prior to scaling for computation of a transform coefficient value.

In some examples, video encoder 20 skips application of the transforms to the transform block. In such examples, video encoder 20 may treat residual sample values may be treated in the same way as transform coefficients. Thus, in examples where video encoder 20 skips application of the transforms, the following discussion of transform coefficients and coefficient blocks may be applicable to transform blocks of residual samples.

After generating a coefficient block, video encoder 20 may quantize the coefficient block. Quantization generally refers to a process in which transform coefficients are quantized to possibly reduce the amount of data used to represent the transform coefficients, providing further compression. In some examples, video encoder 20 skips quantization. After video encoder 20 quantizes a coefficient block, video encoder 20 may generate syntax elements indicating the quantized transform coefficients. Video encoder 20 may entropy encode one or more of the syntax elements indicating the quantized transform coefficients. For example, video encoder 20 may perform Context-Adaptive Binary Arithmetic Coding (CABAC) on the syntax elements indicating the quantized transform coefficients. Thus, an encoded block (e.g., an encoded CU) may include the entropy encoded syntax elements indicating the quantized transform coefficients.

Video encoder 20 may output a bitstream that includes encoded video data. In other words, video encoder 20 may output a bitstream that includes an encoded representation of video data. For example, the bitstream may comprise a sequence of bits that forms a representation of encoded pictures of the video data and associated data. In some examples, a representation of a coded picture may include encoded representations of blocks.

The bitstream may comprise a sequence of network abstraction layer (NAL) units. A NAL unit is a syntax structure containing an indication of the type of data in the NAL unit and bytes containing that data in the form of a raw byte sequence payload (RBSP) interspersed as necessary with emulation prevention bits. Each of the NAL units may include a NAL unit header and encapsulates a RBSP. The NAL unit header may include a syntax element indicating a NAL unit type code. The NAL unit type code specified by the NAL unit header of a NAL unit indicates the type of the NAL unit. A RBSP may be a syntax structure containing an integer number of bytes that is encapsulated within a NAL unit. In some instances, an RBSP includes zero bits.

NAL units may encapsulate RBSPs for video parameter sets (VPSs), sequence parameter sets (SPSs), and picture parameter sets (PPSs). A VPS is a syntax structure comprising syntax elements that apply to zero or more entire coded video sequences (CVSs). An SPS is also a syntax structure comprising syntax elements that apply to zero or more entire CVSs. An SPS may include a syntax element that identifies a VPS that is active when the SPS is active. Thus, the syntax elements of a VPS may be more generally applicable than the syntax elements of an SPS. A PPS is a syntax structure comprising syntax elements that apply to zero or more coded pictures. A PPS may include a syntax element that identifies an SPS that is active when the PPS is active. A slice header of a slice may include a syntax element that indicates a PPS that is active when the slice is being coded.

Video decoder 30 may receive a bitstream generated by video encoder 20. As noted above, the bitstream may comprise an encoded representation of video data. Video decoder 30 may decode the bitstream to reconstruct pictures of the video data. As part of decoding the bitstream, video decoder 30 may parse the bitstream to obtain syntax elements from the bitstream. Video decoder 30 may reconstruct pictures of the video data based at least in part on the syntax elements obtained from the bitstream. The process to reconstruct pictures of the video data may be generally reciprocal to the process performed by video encoder 20 to encode the pictures. For instance, video decoder 30 may use inter prediction or intra prediction to generate one or more predictive blocks for each PU of the current CU may use motion vectors of PUs to determine predictive blocks for the PUs of a current CU. In addition, video decoder 30 may inverse quantize coefficient blocks of TUs of the current CU. Video decoder 30 may perform inverse transforms on the coefficient blocks to reconstruct transform blocks of the TUs of the current CU. In some examples, video decoder 30 may reconstruct the coding blocks of the current CU by adding the samples of the predictive blocks for PUs of the current CU to corresponding decoded samples of the transform blocks of the TUs of the current CU. By reconstructing the coding blocks for each CU of a picture, video decoder 30 may reconstruct the picture.

A slice of a picture may include an integer number of CTUs of the picture. The CTUs of a slice may be ordered consecutively in a scan order, such as a raster scan order. In HEVC, a slice is defined as an integer number of CTUs contained in one independent slice segment and all subsequent dependent slice segments (if any) that precede the next independent slice segment (if any) within the same access unit. Furthermore, in HEVC, a slice segment is defined as an integer number of coding tree units ordered consecutively in the tile scan and contained in a single NAL unit. A tile scan is a specific sequential ordering of CTBs partitioning a picture in which the CTBs are ordered consecutively in CTB raster scan in a tile, whereas tiles in a picture are ordered consecutively in a raster scan of the tiles of the picture. As defined in HEVC and potentially other codecs, a tile is a rectangular region of CTBs within a particular tile column and a particular tile row in a picture. Other definitions of tiles may apply to types of blocks other than CTBs.

Video encoder 20 and/or video decoder 30 (which may also be denoted as "video coder 20/30") may perform various filtering operations on video data. For instance, video coder 20/30 may perform multiple different types of in-loop filtering with respect to a sample of video data, such as bilateral filtering followed by sample adaptive offset filtering.

Video coder 20/30 may apply bilateral filtering in the reconstruction sample domain, in the chain preceding sample adaptive offset (SAO) filtering, deblocking filtering and adaptive loop filtering (ALF). One version of the bilateral filter, referred to as Bilateral Filter (BIF), was proposed and tested in JVET contribution, JVET-J0021. JVET-J0021 proposed that BIF be applied in the reconstruction samples domain as an additional stage preceding loop filters, such as SAO filtering, deblocking filtering and ALF. JVET-J0021 further proposed that BIF be applied to luma blocks with non-zero transform coefficients and at a slice quantization parameter larger than 17. Both the video encoder 20 and video decoder 30 may, when applying the BIF, apply the BIF to reconstructed samples directly after the inverse transform.

On the block boundaries JVET-J0021 proposed to extend the predicted signal with the diffusion filter. When available, JVET-J0021 also proposed use of the neighboring reconstructed information. Video coder 20/30 may determine the availability of the neighboring samples every, as one example, 4 samples (or every MIN PU SIZE samples, if different), on the left and above boundaries of the current block. In this way, when only part of the neighboring information is available, the available part of the neighboring information can still be used. When the neighboring information is not available, video coder 20/30 may mirror the predicted block to fill the extended predicted block.

Referring next to SAO filtering, an input to SAO filtering process is the reconstructed image (potentially after invoking deblocking filtering). The concept of SAO is to attempt to reduce mean sample distortion of a region by first classifying the region samples into multiple categories with a selected classifier, obtaining an offset for each category, and then adding the offset to each sample of the category, where the classifier index and the offsets of the region are coded in the bitstream. In HEVC, the region (the unit for SAO parameters signaling) is defined, as one example, to be a coding tree unit (CTU).

Two SAO types that were adopted in HEVC: edge offset (EO) and band offset (BO). An index of SAO type may be coded (which is in the range of [0, 2]) in the bitstream.

Figure 4A:
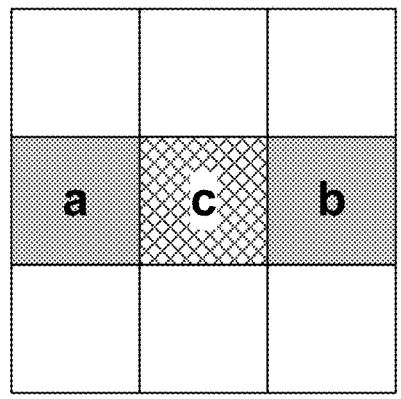
FIGS. 4A-4D each illustrate a 1-D directional pattern for Edge Offset sample classification.
Figure 4B:
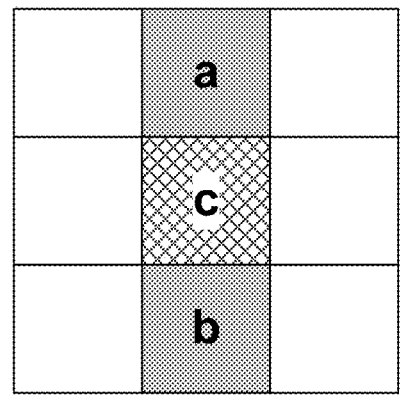
Figure 4C:
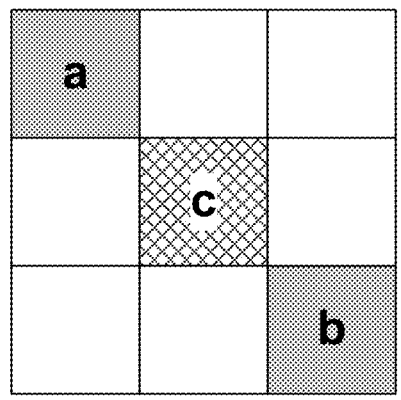
Figure 4D:
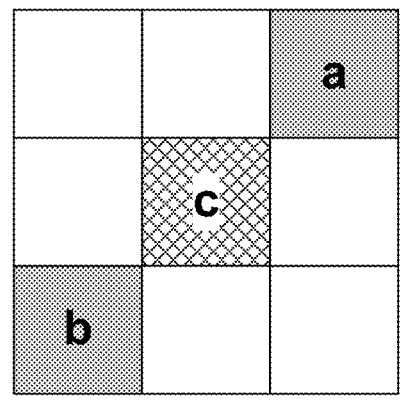

For EO, the sample classification is based on comparison between current samples and neighboring samples according to 1-D directional patterns: horizontal, vertical, 135° diagonal, and 45° diagonal. FIGS. 4A-4D each illustrate a 1-D directional pattern for Edge Offset sample classification. FIG. 4A illustrates a horizontal (EO class=0) pattern, FIG. 4B illustrates a vertical (EO class=1) pattern, FIG. 4C illustrates a 135° diagonal (EO class=2) pattern, and FIG. 4D illustrates a 45° diagonal (EO class=3) pattern. EO is described in detail in Fu et al., "Sample adaptive offset in the HEVC standard," IEEE Trans. Circuits Syst. Video Technol., 22(12): 1755-1764 (2012).

According to the selected EO pattern, five categories denoted by edgeIdx in Table I are further defined. For edgeIdx equal to 0-3, video encoder 20 may signal the magnitude of an offset while the sign flag is implicitly coded, i.e., negative offset for edgeIdx equal to 0 or 1 and positive offset for edgeIdx equal to 2 or 3. For edgeIdx equal to 4, video encoder 20 may always set the offset to 0 which means no operation is required for this case.

TABLE I

| classification for EO | |
|---|---|
| Category (edgeIdx) | Condition |
| 0 | c < a && c < b |
| 1 | (c < a && c == b) \|\| (c == a && c < b) |
| 2 | (c > a && c == b) \|\| (c == a && c > b) |
| 3 | c > a && c > b |
| 4 | None of the above |

For BO, video coder 20/30 performs sample classification based on sample values. Each color component may have respective SAO parameters. BO implies that video encoder 20 adds one offset to all samples of the same band. The sample value range is equally divided into 32 bands. For 8-bit samples ranging from 0 to 255, the width of a band may be 8, and sample values from 8 k to 8 k+7 belong to band k, where k ranges from 0 to 31. Video encoder 20 may signal an average difference between the original samples and reconstructed samples in a band (i.e., offset of a band) to video decoder 30. There may be no constraint on offset signs. Video encoder 20 may signal offsets of four consecutive bands (and in some examples, only offsets of four consecutive bands) and the starting band position to the decoder.

Video encoder 20 and/or video decoder 30 may apply multiple different in-loop filters independent from one another. In other words, each of the multiple different in-loop filters may include separate parameters that control application of the different in-loop filters, some of which may be redundant in view of parameters provided for other in-loop filters. Further, separate implementations of different in-loop filters may consume board space (e.g., as separate functional units within an video coding ASIC), memory (as each filter may require a dedicated amount of memory), memory bandwidth (especially when memories are shared between filters and other logical units), processing cycles, etc.

In accordance with one or more techniques of this disclosure, video encoder 20 and/or video decoder 30 may harmonize application of multiple different in-loop filters by harmonization of a sample adaptive offset filter and a bilateral filter, whereby the sample adaptive offset (SAO) filter may be modified to incorporate the bilateral filter and thereby obtain a combined SAO and bilateral filter. The harmonization of the SAO filter and the bilateral filter may improve coding efficiency (in terms of a number of processor cycles required to perform bilateral filtering or reduce board space, memory and memory bandwidth utilization— as a single buffer and/or read may be needed for both sample adaptive offset filtering and/or bilateral filtering, and the like). Further, parameters used for SOA filtering may be repurposed for use by the bilateral filter, thereby potentially promoting more efficient syntax signaling that may improve video coding (as more bits may be allocated to represent the video data without a similar increase in bitstream bandwidth requirements).

In operation, video coder 20/30 may obtain reconstructed samples of a current block of the video data. Video coder 20/30 may be configured to implement a SAO filter (or, in other words, an SAO filtering engine) that is configured itself to perform bilateral filtering, where the combined filter may be referred to as a combined SAO and bilateral filter. Harmonization of the SAO filtering and bilateral engine may occur by, as one example, removing linear operation from the linear SAO filter set forth in HEVC and elsewhere. Rather than only allow for linear three-tap filtering according to the classifications shown in FIGS. 4A-4D, the SAO filter may perform both linear and non-linear forms of filtering (such as conditional application of different filters).

For example, the SAO filtering engine may determine a delta threshold to which deltas computed between reference samples are compared. The combined SAO and bilateral filtering engine may determine the delta threshold in a number of difference ways, such as parametrically from parameters of the current sample and neighboring, adjacent, or other reference samples of a subsequent block of the video data (where the subsequent block is subsequent to the current block only in that that current block undergoes bilateral filtering and possibly not SAO filtering, except that when the current block undergoes SAO filtering in addition to bilateral filtering, the subsequent block may include the current block). In some examples, the SAO filtering engine in video encoder 20 may signal the delta threshold and/or expressed as a list of integer values (which may, for example, be a power of two).

The combined SAO and bilateral filtering engine of video coder 20/30 may perform bilateral filtering as a result of these harmonizing changes, as the bilateral filter may be non-linear (e.g., two-dimensional rather than one-dimensional). The SAO and bilateral filtering engine may perform bilateral filtering with respect to the obtained reconstructed samples of the current block of the video data to obtain filtered reconstructed samples of the current block of the video data. The SAO and bilateral filtering engine may pass the filtered reconstructed samples to additional in-loop filters, which eventually, after application of any additional filters, is stored to a decoded picture buffer.

In some instances, the combined SAO and bilateral filtering engine of video coder 20/30 may perform both SOA filtering to obtain first filtered reconstructed samples of the current block and bilateral filtering with respect to the reconstructed samples of the current block of video data to obtain second filtered reconstructed samples of the current block. The combined SAO and bilateral filtering engine may next aggregate or otherwise combine (possibly including weighted multiplication where weights may be derived and signaled or just derived) the first filtered reconstructed samples of the current block and the second reconstructed samples of the current block to obtain the combined filtered reconstructed samples of the current block of video data.

In some instances, the combined SAO and bilateral filter may apply bilateral SAO filtering concurrent to application of bilateral filtering, where the reconstructed samples are combined using a weighted sum of the results (which may be referred to as intermediately filtered reconstructed samples) from application of the bilateral filter and the SAO filter. In other instances, the combined SAO and bilateral filter may apply SAO filtering subsequent to application of bilateral filtering, where the reconstructed samples undergo either SAO filtering or bilateral filtering to produce intermediate filtered reconstructed samples to which either bilateral or SAO filtering is applied to determine the filtered reconstructed samples. In yet other instances, the combined SAO and bilateral filter may apply only one of SAO filtering or bilateral filtering (or in other words, without performing one of SAO filtering or bilateral filtering). In any event, more information regarding how the SAO filtering engine may be adapted to incorporate application of the BIF in support of video encoding is described with respect to the example of FIG. 2.

Although described with respect to in loop filters, various aspects of the techniques may be performed with respect to post loop filters. In other words, pixel filtering is either "in loop" filtering or "post loop" filtering. With "in loop" filtering, the filtered pixels form reconstructed data that may be used in the predictive decoding of other video data. In contrast, with "post loop" filtering, the unfiltered data forms the reconstructed data that is used in the predictive decoding of other video data. Thus, with "post loop" filtering, the filtering occurs outside of the decoding loop and only applies to data that will be displayed, but the filtered data is not used for predictive decoding, and instead, the unfiltered data is used for predictive decoding."

Figure 2:
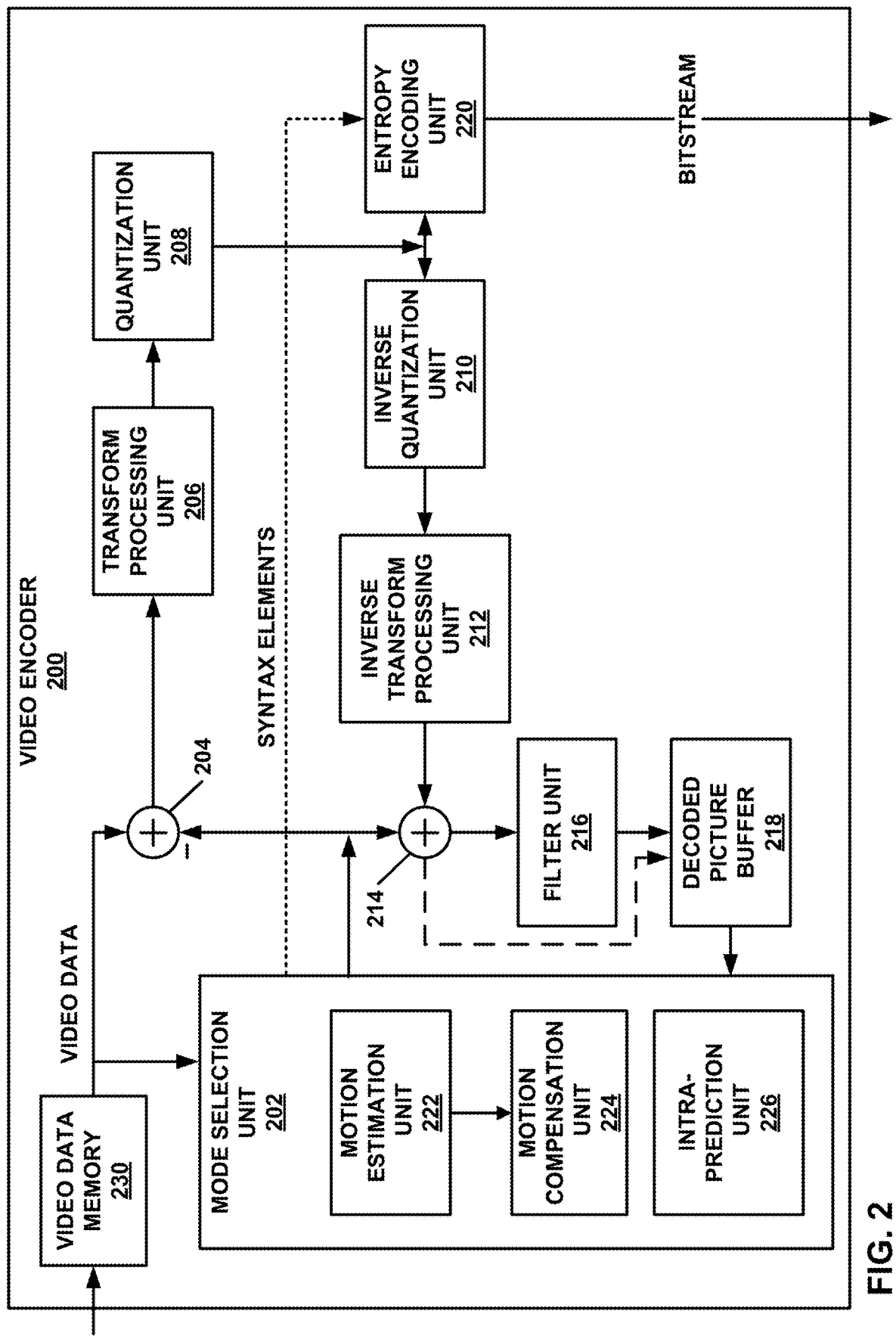
FIG. 2 is a block diagram illustrating examples of a video encoder that may implement the techniques described in this disclosure.

FIG. 2 is a block diagram illustrating an example video encoder 200 that may perform the techniques of this disclosure. Video encoder 200 represents one example of video encoder 20 of FIG. 1, though other examples are possible. FIG. 2 is provided for purposes of explanation and should not be considered limiting of the techniques as broadly exemplified and described in this disclosure. For purposes of explanation, this disclosure describes video encoder 200 in the context of video coding standards such as the HEVC video coding standard and the H.266 video coding standard in development. However, the techniques of this disclosure are not limited to these video coding standards, and are applicable generally to video encoding and decoding.

In the example of FIG. 2, video encoder 200 includes video data memory 230, mode selection unit 202, residual generation unit 204, transform processing unit 206, quantization unit 208, inverse quantization unit 210, inverse transform processing unit 212, reconstruction unit 214, filter unit 216, decoded picture buffer (DPB) 218, and entropy encoding unit 220.

Video data memory 230 may store video data to be encoded by the components of video encoder 200. Video encoder 200 may receive the video data stored in video data memory 230 from, for example, video source 18 (FIG. 1). DPB 218 may act as a reference picture memory that stores reference video data for use in prediction of subsequent video data by video encoder 200. Video data memory 230 and DPB 218 may be formed by any of a variety of memory devices, such as dynamic random access memory (DRAM), including synchronous DRAM (SDRAM), magnetoresistive RAM (MRAM), resistive RAM (RRAM), or other types of memory devices. Video data memory 230 and DPB 218 may be provided by the same memory device or separate memory devices. In various examples, video data memory 230 may be on-chip with other components of video encoder 200, as illustrated, or off-chip relative to those components.

In this disclosure, reference to video data memory 230 should not be interpreted as being limited to memory internal to video encoder 200, unless specifically described as such, or memory external to video encoder 200, unless specifically described as such. Rather, reference to video data memory 230 should be understood as reference memory that stores video data that video encoder 200 receives for encoding (e.g., video data for a current block that is to be encoded). Video data memory 230 may also provide temporary storage of outputs from the various units of video encoder 200.

The various units of FIG. 2 are illustrated to assist with understanding the operations performed by video encoder 200. The units may be implemented as fixed-function circuits, programmable circuits, or a combination thereof. Fixed-function circuits refer to circuits that provide particular functionality, and are preset on the operations that can be performed. Programmable circuits refer to circuits that can programmed to perform various tasks, and provide flexible functionality in the operations that can be performed. For instance, programmable circuits may execute software or firmware that cause the programmable circuits to operate in the manner defined by instructions of the software or firmware. Fixed-function circuits may execute software instructions (e.g., to receive parameters or output parameters), but the types of operations that the fixed-function circuits perform are generally immutable. In some examples, the one or more of the units may be distinct circuit blocks (fixed-function or programmable), and in some examples, the one or more units may be integrated circuits.

Video encoder 200 may include arithmetic logic units (ALUs), elementary function units (EFUs), digital circuits, analog circuits, and/or programmable cores, formed from programmable circuits. In examples where the operations of video encoder 200 are performed by software executed by the programmable circuits, video data memory 230 may store the object code of the software that video encoder 200 receives and executes, or another memory (not shown) may store such instructions.

Video data memory 230 is configured to store received video data. Video encoder 200 may retrieve a picture of the video data from video data memory 230 and provide the video data to residual generation unit 204 and mode selection unit 202. Video data in video data memory 230 may be raw video data that is to be encoded.

Mode selection unit 202 includes a motion estimation unit 222, motion compensation unit 224, and an intra-prediction unit 226. Mode selection unit 202 may include additional functional units to perform video prediction in accordance with other prediction modes. As examples, mode selection unit 202 may include a palette unit, an intra-block copy unit (which may be part of motion estimation unit 222 and/or motion compensation unit 224), an affine unit, a linear model (LM) unit, or the like.

Mode selection unit 202 generally coordinates multiple encoding passes to test combinations of encoding parameters and resulting rate-distortion values for such combinations. The encoding parameters may include partitioning of CTUs into CUs, prediction modes for the CUs, transform types for residual data of the CUs, quantization parameters for residual data of the CUs, and so on. Mode selection unit 202 may ultimately select the combination of encoding parameters having rate-distortion values that are better than the other tested combinations.

Video encoder 200 may partition a picture retrieved from video data memory 230 into a series of CTUs, and encapsulate one or more CTUs within a slice. Mode selection unit 202 may partition a CTU of the picture in accordance with a tree structure, such as the QTBT structure or the quad-tree structure of HEVC described above. As described above, video encoder 200 may form one or more CUs from partitioning a CTU according to the tree structure. Such a CU may also be referred to generally as a "video block" or "block."

In general, mode selection unit 202 also controls the components thereof (e.g., motion estimation unit 222, motion compensation unit 224, and intra-prediction unit 226) to generate a prediction block for a current block (e.g., a current CU, or in HEVC, the overlapping portion of a PU and a TU). For inter-prediction of a current block, motion estimation unit 222 may perform a motion search to identify one or more closely matching reference blocks in one or more reference pictures (e.g., one or more previously coded pictures stored in DPB 218). In particular, motion estimation unit 222 may calculate a value representative of how similar a potential reference block is to the current block, e.g., according to sum of absolute difference (SAD), sum of squared differences (SSD), mean absolute difference (MAD), mean squared differences (MSD), or the like. Motion estimation unit 222 may generally perform these calculations using sample-by-sample differences between the current block and the reference block being considered. Motion estimation unit 222 may identify a reference block having a lowest value resulting from these calculations, indicating a reference block that most closely matches the current block.

Motion estimation unit 222 may form one or more motion vectors (MVs) that defines the positions of the reference blocks in the reference pictures relative to the position of the current block in a current picture. Motion estimation unit 222 may then provide the motion vectors to motion compensation unit 224. For example, for uni-directional inter-prediction, motion estimation unit 222 may provide a single motion vector, whereas for bi-directional inter-prediction, motion estimation unit 222 may provide two motion vectors. Motion compensation unit 224 may then generate a prediction block using the motion vectors. For example, motion compensation unit 224 may retrieve data of the reference block using the motion vector. As another example, if the motion vector has fractional sample precision, motion compensation unit 224 may interpolate values for the prediction block according to one or more interpolation filters. Moreover, for bi-directional inter-prediction, motion compensation unit 224 may retrieve data for two reference blocks identified by respective motion vectors and combine the retrieved data, e.g., through sample-by-sample averaging or weighted averaging.

As another example, for intra-prediction, or intra-prediction coding, intra-prediction unit 226 may generate the prediction block from samples neighboring the current block. For example, for directional modes, intra-prediction unit 226 may generally mathematically combine values of neighboring samples and populate these calculated values in the defined direction across the current block to produce the prediction block. As another example, for DC mode, intra-prediction unit 226 may calculate an average of the neighboring samples to the current block and generate the prediction block to include this resulting average for each sample of the prediction block.

In HEVC, for the Intra prediction of a luma block includes 35 modes, including the Planar mode, DC mode and 33 angular modes. In HEVC, after the intra prediction block has been generated for VER (vertical) and HOR (horizontal) intra modes, the left-most column and top-most row of the prediction samples may be further adjusted, respectively.

To capture finer edge directions presented in natural videos, the directional intra modes is extended from 33, as defined in HEVC, to 65. The new directional modes are depicted as dashed arrows in FIG. 4B, and the Planar and DC modes remain the same. These denser directional intra prediction modes apply for all block sizes and both luma and chroma intra predictions.

In addition, four-tap instead of two-tap intra interpolation filters may be utilized to generate the intra prediction block which improves the directional intra prediction accuracy. The boundary filter in HEVC may be further extended to several diagonal intra modes, and boundary samples up to four columns or rows are further adjusted using a two-tap (for intra mode 2 & 34) or a three-tap filter (for intra mode 3-6 & 30-33).

Position dependent intra prediction combination (PDPC) is a post-processing for Intra prediction which invokes a combination of HEVC Intra prediction with un-filtered boundary reference samples. In adaptive reference sample smoothing (ARSS), two low pass filters (LPF) are used to process reference samples:

3-tap LPF with the coefficients of [1, 2, 1]/4
5-tap LPF with the coefficients of [2, 3, 6, 3, 2]/16

CCLM is a new chroma prediction method wherein the reconstructed luma blocks and the neighboring chroma block are utilized to derive the chroma prediction block. Additional information about PDPC, ARSS, and CCLM may be found in JVET-D1001, 4th Meeting: Chengdu, CN, 15-21 Oct. 2016 (hereinafter, "JVET-D1001").

Mode selection unit 202 provides the prediction block to residual generation unit 204. Residual generation unit 204 receives a raw, uncoded version of the current block from video data memory 230 and the prediction block from mode selection unit 202. Residual generation unit 204 calculates sample-by-sample differences between the current block and the prediction block. The resulting sample-by-sample differences define a residual block for the current block. In some examples, residual generation unit 204 may also determine differences between sample values in the residual block to generate a residual block using residual differential pulse code modulation (RDPCM). In some examples, residual generation unit 204 may be formed using one or more subtractor circuits that perform binary subtraction.

In examples where mode selection unit 202 partitions CUs into PUs, each PU may be associated with a luma prediction unit and corresponding chroma prediction units. Video encoder 200 and video decoder 300 may support PUs having various sizes. As indicated above, the size of a CU may refer to the size of the luma coding block of the CU and the size of a PU may refer to the size of a luma prediction unit of the PU. Assuming that the size of a particular CU is 2N×2N, video encoder 200 may support PU sizes of 2N×2N or N×N for intra prediction, and symmetric PU sizes of 2N×2N, 2N×N, N×2N, N×N, or similar for inter prediction. Video encoder 20 and video decoder 30 may also support asymmetric partitioning for PU sizes of 2NxnU, 2NxnD, nLx2N, and nRx2N for inter prediction.

In examples where mode selection unit does not further partition a CU into PUs, each CU may be associated with a luma coding block and corresponding chroma coding blocks. As above, the size of a CU may refer to the size of the luma coding block of the CU. The video encoder 200 and video decoder 120 may support CU sizes of 2N×2N, 2N×N, or N×2N.

For other video coding techniques such as an intra-block copy mode coding, an affine-mode coding, and linear model (LM) mode coding, as few examples, mode selection unit 202, via respective units associated with the coding techniques, generates a prediction block for the current block being encoded. In some examples, such as palette mode coding, mode selection unit 202 may not generate a prediction block, and instead generate syntax elements that indicate the manner in which to reconstruct the block based on a selected palette. In such modes, mode selection unit 202 may provide these syntax elements to entropy encoding unit 220 to be encoded.

As described above, residual generation unit 204 receives the video data for the current block and the corresponding prediction block. Residual generation unit 204 then generates a residual block for the current block. To generate the residual block, residual generation unit 204 calculates sample-by-sample differences between the prediction block and the current block.

Transform processing unit 206 applies one or more transforms to the residual block to generate a block of transform coefficients (referred to herein as a "transform coefficient block"). Transform processing unit 206 may apply various transforms to a residual block to form the transform coefficient block. For example, transform processing unit 206 may apply a discrete cosine transform (DCT), a directional transform, a Karhunen-Loeve transform (KLT), or a conceptually similar transform to a residual block. In some examples, transform processing unit 206 may perform multiple transforms to a residual block, e.g., a primary transform and a secondary transform, such as a rotational transform. In some examples, transform processing unit 206 does not apply transforms to a residual block.

Quantization unit 208 may quantize the transform coefficients in a transform coefficient block, to produce a quantized transform coefficient block. Quantization unit 208 may quantize transform coefficients of a transform coefficient block according to a quantization parameter (QP) value associated with the current block. Video encoder 200 (e.g., via mode selection unit 202) may adjust the degree of quantization applied to the coefficient blocks associated with the current block by adjusting the QP value associated with the CU. Quantization may introduce loss of information, and thus, quantized transform coefficients may have lower precision than the original transform coefficients produced by transform processing unit 206.

Inverse quantization unit 210 and inverse transform processing unit 212 may apply inverse quantization and inverse transforms to a quantized transform coefficient block, respectively, to reconstruct a residual block from the transform coefficient block. Reconstruction unit 214 may produce a reconstructed block corresponding to the current block (albeit potentially with some degree of distortion) based on the reconstructed residual block and a prediction block generated by mode selection unit 202. For example, reconstruction unit 214 may add samples of the reconstructed residual block to corresponding samples from the prediction block generated by mode selection unit 202 to produce the reconstructed block.

Filter unit 216 may perform one or more filter operations on reconstructed blocks. For example, filter unit 216 may perform deblocking operations to reduce blockiness artifacts along edges of CUs. As illustrated by dashed lines, operations of filter unit 216 may be skipped in some examples. In addition, in some examples, filter unit 216 may perform a combination of SAO filtering and bilateral filtering as described herein.

Video encoder 200 stores reconstructed blocks in DPB 218. For instance, in examples where operations of filter unit 216 are not needed, reconstruction unit 214 may store reconstructed blocks to DPB 218. In examples where operations of filter unit 216 are needed, filter unit 216 may store the filtered reconstructed blocks to DPB 218. Motion estimation unit 222 and motion compensation unit 224 may retrieve a reference picture from DPB 218, formed from the reconstructed (and potentially filtered) blocks, to inter-predict blocks of subsequently encoded pictures. In addition, intra-prediction unit 226 may use reconstructed blocks in DPB 218 of a current picture to intra-predict other blocks in the current picture.

In general, entropy encoding unit 220 may entropy encode syntax elements received from other functional components of video encoder 200. For example, entropy encoding unit 220 may entropy encode quantized transform coefficient blocks from quantization unit 208. As another example, entropy encoding unit 220 may entropy encode prediction syntax elements (e.g., motion information for inter-prediction or intra-mode information for intra-prediction) from mode selection unit 202. Entropy encoding unit 220 may perform one or more entropy encoding operations on the syntax elements, which are another example of video data, to generate entropy-encoded data. For example, entropy encoding unit 220 may perform a context-adaptive variable length coding (CAVLC) operation, a CABAC operation, a variable-to-variable (V2V) length coding operation, a syntax-based context-adaptive binary arithmetic coding (SBAC) operation, a Probability Interval Partitioning Entropy (PIPE) coding operation, an Exponential-Golomb encoding operation, or another type of entropy encoding operation on the data. In some examples, entropy encoding unit 220 may operate in bypass mode where syntax elements are not entropy encoded.

Video encoder 200 may output a bitstream that includes the entropy encoded syntax elements needed to reconstruct blocks of a slice or picture. In particular, entropy encoding unit 220 may output the bitstream.

The operations described above are described with respect to a block. Such description should be understood as being operations for a luma coding block and/or chroma coding blocks. As described above, in some examples, the luma coding block and chroma coding blocks are luma and chroma components of a CU. In some examples, the luma coding block and the chroma coding blocks are luma and chroma components of a PU.

In some examples, operations performed with respect to a luma coding block need not be repeated for the chroma coding blocks. As one example, operations to identify a motion vector (MV) and reference picture for a luma coding block need not be repeated for identifying a MV and reference picture for the chroma blocks. Rather, the MV for the luma coding block may be scaled to determine the MV for the chroma blocks, and the reference picture may be the same. As another example, the intra-prediction process may be the same for the luma coding blocks and the chroma coding blocks.

As discussed above, filter unit 216 may perform one or more filter operations on reconstructed blocks. In some examples, such as in HEVC, filter unit 216 may employ multiple in-loop filters, including a bilateral filter (or bilateral interpolation filter—BIF) and a Sample adaptive offset (SAO) filter.

Input to the de-blocking filter coding tool is a reconstructed image after prediction (e.g., intra or inter prediction, but other prediction modes are possible). The deblocking filter performs detection of the artifacts at the coded block boundaries and attenuates the artifacts by applying a selected filter. As described in Norkin et al., "HEVC Deblocking Filter", IEEE Trans. Circuits Syst. Video Technol., 22(12): 1746-1754 (2012), compared to the H.264/AVC deblocking filter, the HEVC deblocking filter has lower computational complexity and better parallel processing capabilities while still achieving significant reduction of the visual artifacts.

Input to the SAO filter may comprise a reconstructed image after invoking deblocking filtering. One goal of SAO filtering is to reduce mean sample distortion of a region by first classifying the region samples into multiple categories with a selected classifier, obtaining an offset for each category, and then adding the offset to each sample of the category, where the classifier index and the offsets of the region are coded in the bitstream. In HEVC, the region (the unit for SAO parameters signaling) is defined to be a coding tree unit (CTU). Two SAO types that can satisfy the requirements of low complexity are adopted in HEVC: edge offset (EO) and band offset (BO). An index of SAO type is coded (which is in the range of [0, 2]).

For EO, the sample classification is based on comparison between current samples and neighboring samples according to 1-dimensional (1-D) directional patterns: horizontal, vertical, 135° diagonal, and 45° diagonal. FIGS. 4A-4D each illustrate a 1-D directional pattern for Edge Offset sample classification. FIG. 4A illustrates a horizontal (EO class=0) pattern, FIG. 4B illustrates a vertical (EO class=1) pattern, FIG. 4C illustrates a 135° diagonal (EO class=2) pattern, and FIG. 4D illustrates a 45° diagonal (EO class=3) pattern. EO is described in detail in Fu et al., "Sample adaptive offset in the HEVC standard," IEEE Trans. Circuits Syst. Video Technol., 22(12): 1755-1764 (2012).

According to the selected EO pattern, five categories denoted by edgeIdx in Table 1 are further defined. For edgeIdx equal to 0-3, the magnitude of an offset may be signaled while the sign flag is implicitly coded, i.e., negative offset for edgeIdx equal to 0 or 1 and positive offset for edgeIdx equal to 2 or 3. For edgeIdx equal to 4, the offset is always set to 0 which means no operation is required for this case.

TABLE 1 classification for EO

| Category (edgeIdx) | Condition |
|---|---|
| 0 | c < a && c < b |
| 1 | (c < a && c == b) \|\| (c == a && c < b) |
| 2 | (c > a && c == b) \|\| (c == a && c > b) |
| 3 | c > a && c > b |
| 4 | None of the above |

For BO, the sample classification is based on sample values. Each color component may have its own SAO parameters. BO implies one offset is added to all samples of the same band. The sample value range is equally divided into 32 bands. For 8-bit samples ranging from 0 to 255, the width of a band is 8, and sample values from 8 k to 8 k+7 belong to band k, where k ranges from 0 to 31. The average difference between the original samples and reconstructed samples in a band (i.e., offset of a band) is signaled to the decoder. There may be no constraint on offset signs. Offsets of four consecutive bands (and in some examples, only offsets of four consecutive bands) and the starting band position may be signaled to the decoder.

To reduce side information, multiple CTUs can be merged together (either copying the parameters from above CTU (through setting sao_merge_left_flag equal to 1) or left CTU (through setting sao_merge_up_flag equal to 1) to share SAO parameters.

To reduce side information, video encoder 20 may merge multiple CTUs together (either copying the parameters from an above CTU, e.g., by setting sao_merge_left_flag equal to 1) from the current CTU or a left CTU (e.g., by setting sao_merge_up_flag equal to 1) from the current CTU, and thereby potentially share SAO parameters.

Figure 5:
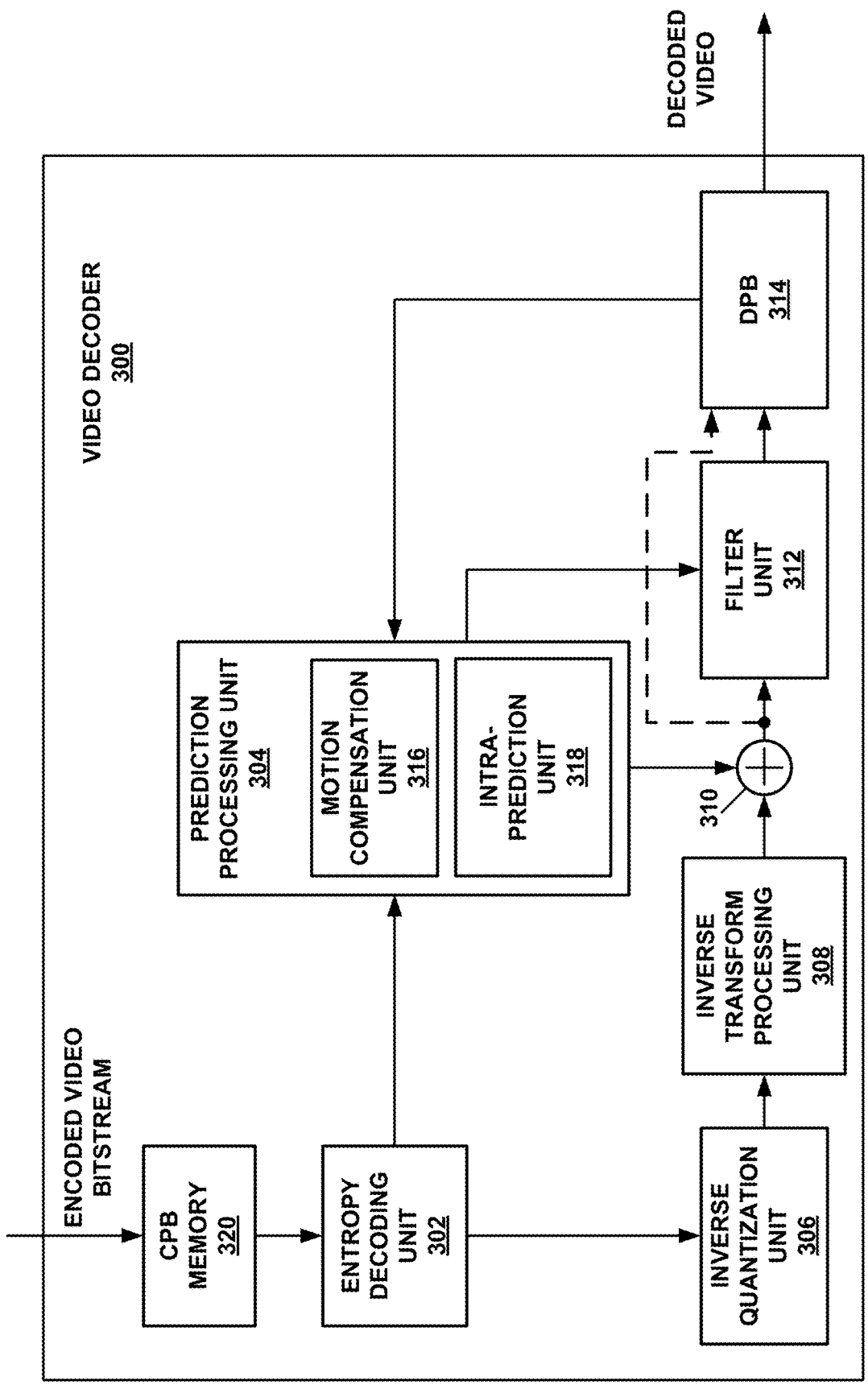
FIG. 5 is a block diagram illustrating an example video decoder that may implement one or more techniques described in this disclosure.

The following syntax tables present information regarding how video encoder 200 may form the bitstream 16 to conform with the syntax expected by video decoder 30 (as described by way of example in more detail with respect to video decoder 300 shown in FIG. 5) when video encoder 200 signals application of SAO is to occur.

Coding Tree Unit Syntax

|  | Descriptor |
|---|---|
| coding_tree_unit( ) {<br>  xCtb = ( CtbAddrInRs % PicWidthInCtbsY ) <<<br>  CtbLog2SizeY<br>  yCtb = ( CtbAddrInRs / PicWidthInCtbsY ) <<<br>  CtbLog2SizeY<br>  if( slice_sao_luma_flag \|\| slice_sao_chroma_flag )<br>    sao( xCtb >> CtbLog2SizeY, yCtb >><br>    CtbLog2SizeY )<br>  coding_quadtree( xCtb, yCtb, CtbLog2SizeY, 0 )<br>} |  |

Sample Adaptive Offset Syntax

|  | Descriptor |
|---|---|
| sao( rx, ry ) {<br>  if( rx > 0 ) {<br>    leftCtbInSliceSeg = CtbAddrInRs > SliceAddrRs<br>    leftCtbInTile = TileId[ CtbAddrInTs ] = =<br>TileId[ CtbAddrRsToTs[ CtbAddrInRs − 1 ] ]<br>    if( leftCtbInSliceSeg && leftCtbInTile )<br>      sao_merge_left_flag | ae(v) |
|   }<br>  if( ry > 0 && !sao_merge_left_flag ) {<br>    upCtbInSliceSeg =<br>( CtbAddrInRs − PicWidthInCtbsY ) >= SliceAddrRs<br>    upCtbInTile = TileId[ CtbAddrInTs ] = =<br>TileId[ CtbAddrRsToTs[ CtbAddrInRs − PicWidthInCtbsY ] ]<br>    if( upCtbInSliceSeg && upCtbInTile )<br>      sao_merge_up_flag | ae(v) |
|   }<br>  if( !sao_merge_up_flag && !sao_merge_left_flag )<br>    for( cIdx = 0; cIdx < ( ChromaArrayType != 0 ? 3 : 1 ); cIdx++ )<br>      if( ( slice_sao_luma_flag && cIdx = = 0 ) \|\|<br>        ( slice_sao_chroma_flag && cIdx > 0 ) ) {<br>        if( cIdx = = 0 )<br>          sao_type_idx_luma | ae(v) |
|         else if( cIdx = = 1 )<br>          sao_type_idx_chroma | ae(v) |
|         if( SaoTypeIdx[ cIdx ][ rx ][ ry ] != 0 ) {<br>          for( i = 0; i < 4; i++ )<br>            sao_offset_abs[ cIdx ][ rx ][ ry ][ i ] | ae(v) |
|           if( SaoTypeIdx[ cIdx ][ rx ][ ry ] = = 1 ) {<br>            for( i = 0; i < 4; i++ )<br>              if( sao_offset_abs[ cIdx ][ rx ][ ry ][ i ] != 0 )<br>                sao_offset_sign[ cIdx ][ rx ][ ry ][ i ] | ae(v) |
|             sao_band_position[ cIdx ][ rx ][ ry ] | ae(v) |
|           } else {<br>            if( cIdx = = 0 )<br>              sao_eo_class_luma | ae(v) |
|             if( cIdx = = 1 )<br>              sao_eo_class_chroma | ae(v) |
|           }<br>        }<br>      }<br>} |  |

The following denotes the semantics descriptive of the syntax elements being signaled according to the above syntax table (and denoted in bold font).

sao_merge_left_flag equal to 1 specifies that the syntax elements sao_type_idx_luma, sao_type_idx_chroma, sao_band_position, sao_eo_class_luma, sao_eo_class_chroma, sao_offset_abs, and sao_offset_sign are derived from the corresponding syntax elements of the left coding tree block. sao_merge_left_flag equal to 0 specifies that these syntax elements are not derived from the corresponding syntax elements of the left coding tree block. When sao_merge_left_flag is not present, it is inferred to be equal to 0.

sao_merge_up_flag equal to 1 specifies that the syntax elements sao_type_idx_luma, sao_type_idx_chroma, sao_band_position, sao_eo_class_luma, sao_eo_class_chroma, sao_offset_abs, and sao_offset_sign are derived from the corresponding syntax elements of the above coding tree block. sao_merge_up_flag equal to 0 specifies that these syntax elements are not derived from the corresponding syntax elements of the above coding tree block. When sao_merge_up_flag is not present, it is inferred to be equal to 0.

sao_type_idx_luma specifies the offset type for the luma component. The array SaoTypeIdx[cIdx][rx][ry] specifies the offset type as specified in Table 0-2 for the coding tree block at the location (rx, ry) for the colour component cIdx. The value of SaoTypeIdx[0][rx][ry] is derived as follows:
  If sao_type_idx_luma is present, SaoTypeIdx[0][rx][ry] is set equal to sao_type_idx_luma.
  Otherwise (sao_type_idx_luma is not present), SaoTypeIdx[0][rx][ry] is derived as follows:
    If sao_merge_left_flag is equal to 1, SaoTypeIdx[0][rx][ry] is set equal to SaoTypeIdx[ 0][rx−1][ry].
    Otherwise, if sao_merge_up_flag is equal to 1, SaoTypeIdx[0][rx][ry] is set equal to SaoTypeIdx[0][rx][ry−1].
    Otherwise, SaoTypeIdx[0][rx][ry] is set equal to 0.
  sao_type_idx_chroma specifies the offset type for the chroma components. The values of SaoTypeIdx[cIdx][rx][ry] are derived as follows for cIdx equal to 1 . . . 2:
If sao_type_idx_chroma is present, SaoTypeIdx[cIdx][rx][ry] is set equal to sao_type_idx_chroma.
Otherwise (sao_type_idx_chroma is not present), SaoTypeIdx[cIdx][rx][ry] is derived as follows:
  If sao_merge_left_flag is equal to 1, SaoTypeIdx[cIdx][rx][ry] is set equal to SaoTypeIdx[cIdx][rx−1][ry].
  Otherwise, if sao_merge_up_flag is equal to 1, SaoTypeIdx[cIdx][rx][ry] is set equal to SaoTypeIdx[cIdx][rx][ry−1].
  Otherwise, SaoTypeIdx[cIdx][rx][ry] is set equal to 0.

TABLE 0-2

| Specification of the SAO type | |
| --- | --- |
| SaoTypeIdx[ cIdx ][ rx ][ ry ] | SAO type (informative) |
| 0 | Not applied |
| 1 | Band offset |
| 2 | Edge offset | sao_offset_abs[cIdx][rx][ry][i] specifies the offset value of i-th category for the coding tree block at the location (rx, ry) for the colour component cIdx.

When sao_offset_abs[cIdx][rx][ry][i] is not present, it is inferred as follows:
  If sao_merge_left_flag is equal to 1, sao_offset_abs[cIdx][rx][ry][i] is inferred to be equal to sao_offset_abs[cIdx][rx−1][ry][i].
  Otherwise, if sao_merge_up_flag is equal to 1, sao_offset_abs[cIdx][rx][ry][i] is inferred to be equal to sao_offset_abs[cIdx][rx][ry−1][i].
  Otherwise, sao_offset_abs[cIdx][rx][ry][i] is inferred to be equal to 0.

sao_offset_sign[cIdx][rx][ry][i] specifies the sign of the offset value of i-th category for the coding tree block at the location (rx, ry) for the colour component cIdx.

When sao_offset_sign[cIdx][rx][ry][i] is not present, it is inferred as follows:
  If sao_merge_left_flag is equal to 1, sao_offset_sign[cIdx][rx][ry][i] is inferred to be equal to sao_offset_sign[cIdx][rx−1][ry][i].
  Otherwise, if sao_merge_up_flag is equal to 1, sao_offset_sign[cIdx][rx][ry][i] is inferred to be equal to sao_offset_sign[cIdx][rx][ry−1][i].
  Otherwise, if SaoTypeIdx[cIdx][rx][ry] is equal to 2, the following applies:
    If i is equal to 0 or 1, sao_offset_sign[cIdx][rx][ry][i] is inferred to be equal 0.
    Otherwise (i is equal to 2 or 3), sao_offset_sign[cIdx][rx][ry][i] is inferred to be equal 1.
  Otherwise, sao_offset_sign[cIdx][rx][ry][i] is inferred to be equal 0.

The variable log 2OffsetScale is derived as follows:
  If cIdx is equal to 0, log 2OffsetScale is set equal to log 2_sao_offset_scale_luma.
  Otherwise (cIdx is equal to 1 or 2), log 2OffsetScale is set equal to log 2_sao_offset_scale_chroma.

The list SaoOffsetVal[cIdx][rx][ry][i] for i ranging from 0 to 4, inclusive, is derived as follows:
SaoOffsetVal[cIdx][rx][ry][0]=0
for (i=0; i<4; i++)

$$SaoOffsetVal[cIdx][rx][ry][i+1] = (1-2*sao\_offset\_sign[cIdx][rx][ry][i])*sao\_offset\_abs[cIdx][rx][ry][i] << \log 2OffsetScale \quad (0-1)$$

sao_band_position[cIdx][rx][ry] specifies the displacement of the band offset of the sample range when SaoTypeIdx[cIdx][rx][ry] is equal to 1.

When sao_band_position[cIdx][rx][ry] is not present, it is inferred as follows:
  If sao_merge_left_flag is equal to 1, sao_band_position[cIdx][rx][ry] is inferred to be equal to sao_band_position[cIdx][rx−1][ry].
  Otherwise, if sao_merge_up_flag is equal to 1, sao_band_position[cIdx][rx][ry] is inferred to be equal to sao_band_position[cIdx][rx][ry−1].
  Otherwise, sao_band_position[cIdx][rx][ry] is inferred to be equal to 0.

sao_eo_class_luma specifies the edge offset class for the luma component. The array SaoEoClass[cIdx][rx][ry] specifies the offset type as specified in Table 0-3 for the coding tree block at the location (rx, ry) for the colour component cIdx. The value of SaoEoClass[0][rx][ry] is derived as follows:
  If sao_eo_class_luma is present, SaoEoClass[0][rx][ry] is set equal to sao_eo_class_luma.
  Otherwise (sao_eo_class_luma is not present), SaoEoClass[0][rx][ry] is derived as follows:
    If sao_merge_left_flag is equal to 1, SaoEoClass[0][rx][ry] is set equal to SaoEoClass[0][rx−1][ry].

Otherwise, if sao_merge_up_flag is equal to 1, SaoEoClass[0][rx][ry] is set equal to SaoEoClass[0][rx][ry−1].

Otherwise, SaoEoClass[0][rx][ry] is set equal to 0.

sao_eo_class_chroma specifies the edge offset class for the chroma components. The values of SaoEoClass[cIdx][rx][ry] are derived as follows for cIdx equal to 1 . . . 2:

If sao_eo_class_chroma is present, SaoEoClass[cIdx][rx][ry] is set equal to sao_eo_class_chroma.

Otherwise (sao_eo_class_chroma is not present), SaoEoClass[cIdx][rx][ry] is derived as follows:

If sao_merge_left_flag is equal to 1, SaoEoClass[cIdx][rx][ry] is set equal to SaoEoClass[cIdx][rx−1][ry].

Otherwise, if sao_merge_up_flag is equal to 1, SaoEoClass[cIdx][rx][ry] is set equal to SaoEoClass[cIdx][rx][ry−1].

Otherwise, SaoEoClass[cIdx][rx][ry] is set equal to 0.

TABLE 0-3

Specification of the SAO edge offset class

| SaoEoClass[ cIdx ][ rx ][ ry ] | SAO edge offset class (informative) |
|---|---|
| 0 | 1D 0-degree edge offset |
| 1 | 1D 90-degree edge offset |
| 2 | 1D 135-degree edge offset |
| 3 | 1D 45-degree edge offset |

According to various aspects of the techniques described in this disclosure, filter unit 216 may improve video coding. It is to be understood that one or more of the foregoing enumerated aspects of the techniques may be used independently, or in combination with other processes.

Filter unit 216 may implement the BIF according to JVET-J0021 in which case the BIF is applied in the reconstruction samples domain as an additional stage preceding in-loop filters. In some examples, filter unit 216 may explicitly derive the filter parameters of BIF, e.g., weights from the coded information.

Figure 3:
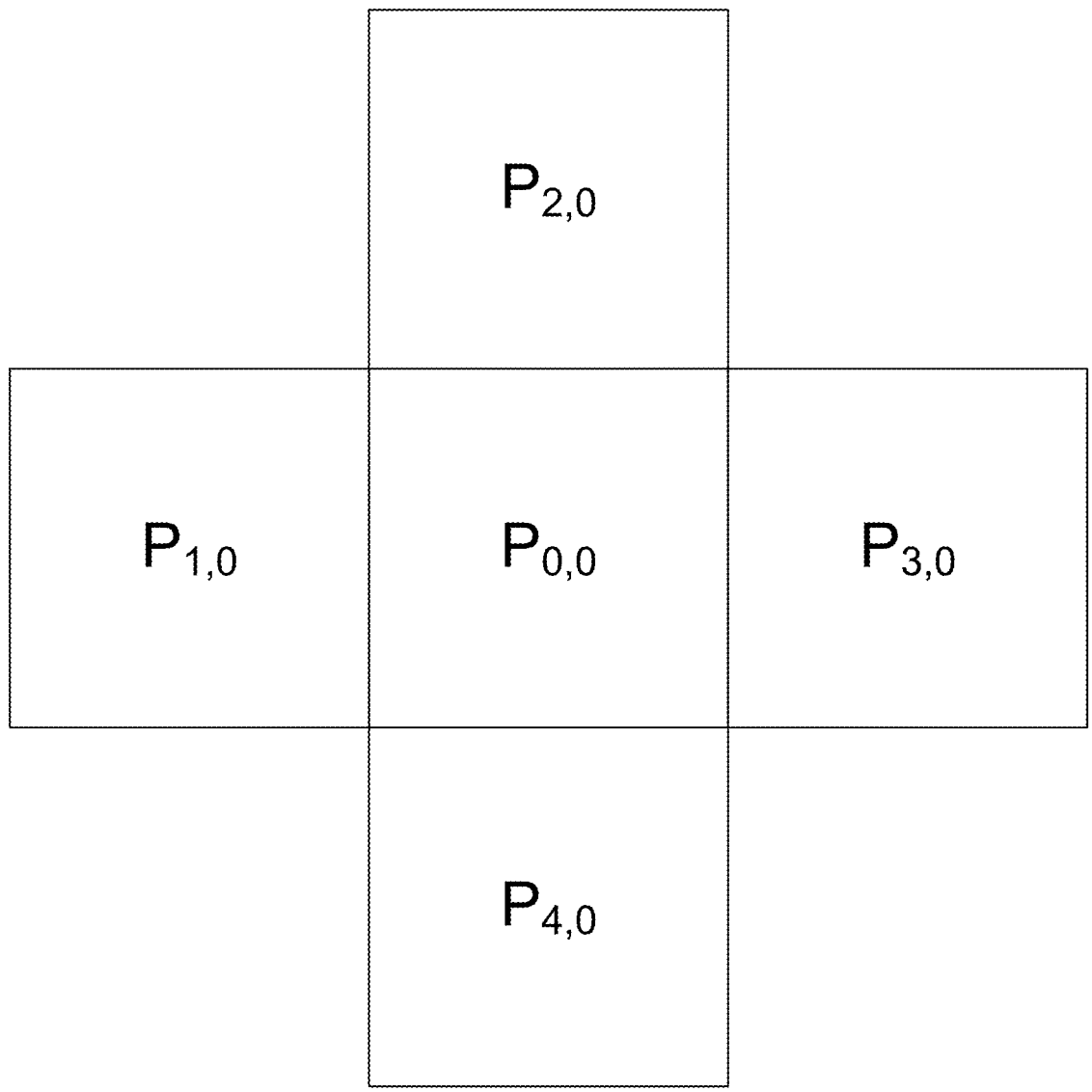
FIG. 3 is a block diagram illustrating a current sample and four neighboring samples for bilateral filtering.

The BIF process, in this example, is defined as:

$$P_{0,0}'P_{0,0}+\Sigma_{k=1}^{K}W_k(abs(P_{k,0}-P_{0,0}))\times(P_{k,0}-P_{0,0}), \quad (1)$$

where $P_{0,0}$ is the intensity of the current sample and $P_{0,0}'$ is the modified intensity of the current sample, $P_{k,0}$ and $W_k$ are the intensity and weighting parameter for the k-th neighboring sample, respectively. FIG. 3 is a block diagram illustrating a current sample and four neighboring samples for bilateral filtering. That is, an example of one current sample and its four neighboring samples (i.e., K=4 in this example) is depicted in FIG. 3.

In some examples, the weight $W_k$ (x) associated with the k-th neighboring sample is defined as follows:

$$W_k(x) = Distance_k \times Range_k(x) \quad (2)$$

where $$Distance_k = e^{\left(-\frac{10000}{2\sigma_d^2}\right)} / 1 + 4 * e^{\left(-\frac{10000}{2\sigma_d^2}\right)}, \quad (3)$$

$$Range_k(x) = e^{\left(-\frac{x^2}{8*(QP-17)*(QP-17)}\right)}$$

and $\sigma_d$ may be dependent on the coded mode and coding block sizes. Filter unit 216 may apply the described BIF process to intra-coded blocks, and inter-coded blocks when a corresponding TU is further split, to enable parallel processing.

To better capture statistical properties of the video signal, and potentially improve performance of the BIF, filter unit 216 may adjust weight functions set forth in Equation (2) by the $\alpha_d$ parameter, tabulated in a Table that filter unit 216 may provide to video decoder 30 as side information and being dependent on coding mode and parameters of block partitioning (minimal size).

In some instances, functionality of the SAO filtering engine may be extended by introducing non-linear operations in order to incorporate application of the BIF as outlined below:

Value of video samples $I_a$, $I_c$ (respective a and b, as shown in the examples of FIGS. 4A-4D) and surrounding the central sample location c is compared against the value the value c and absolute value of the difference is estimated:

$$\Delta I_a = I_a - I_c \text{ and/or } \Delta I_b = I_b - I_c$$

Derived $\Delta I_i$ value is compared against the threshold $\Delta T$, e.g. $\Delta I_i < \Delta T$ or $abs(\Delta I_i) < \Delta T$ Processing (filtering) of samples $I_a$ or $I_c$ is different depending on the classification of the sample against the threshold $\Delta T$, e.g.

Apply filter1 to sample i and/or c, if abs $(\Delta I_i) \leq \Delta T$

Apply filter2 to sample i and/or c, if abs $(\Delta I_i) > \Delta T$

In some instances, processing of $I_a$ or $I_c$ may remain unchanged, but processing value $I_a$ or $I_c$ is being clipped against the threshold:

$$I'_b = clip3(I_b - I_c, I_c - \Delta T, I_c + \Delta T)$$

$$I'_a = clip3(I_a - I_c, I_c - \Delta T, I_c + \Delta T)$$

In this respect, filtering unit 216 may determine a delta threshold value (e.g., $\Delta T$), and determine, based on a current reconstructed sample of the reconstructed samples of a block of video data and a neighboring reconstructed sample of the reconstructed samples of the block of video data, a delta value (e.g., $\Delta I_a$ and/or $\Delta I_b$, which may also be denoted as a "difference value"). Filter unit 216 may then apply, when the delta value is less than or equal to the threshold delta value (which may also be denoted as a "difference threshold") and to the reconstructed samples of the current block of the video data, a first version of the combined sample adaptive offset and bilateral filter (i.e., "filter1" in the above example, which may also be referred to as a "first bilateral filter"), to obtain the filtered reconstructed samples. Filter unit 216 may apply, when the delta value is greater than the threshold delta value and to the reconstructed samples of the current block of the video data, a second version of the combined sample adaptive offset and bilateral filter (i.e., filter 2 in the above example, which may be referred to as a "second bilateral filter"), to obtain the filtered reconstructed samples.

Further, in some instances, filter unit 216 may determine the delta threshold value, and determine, based on a current reconstructed sample of the reconstructed samples and a neighboring reconstructed sample of the reconstructed samples, the delta value. However, rather than apply different versions of the combined SAO and bilateral filter, filter unit 216 may clip (referred to as a "clip3" in the examples above), based on the delta threshold value, one or more of the neighboring reconstructed samples, and obtaining, based on the clipped one or more neighboring reconstructed samples, the second filtered samples.

In addition, filter unit 216 may derive or otherwise obtain a ΔT value as outlined below:

- ΔT value is an integer value which is derived using a determined process based on parameters of CU to which samples a, b and c belong (referring again to the example of FIGS. 4A-4D). This may include dependency on a quantization parameter (QP) utilized for coding the CU, block sizes (width and/or length), and/or number of samples including in a current CU. The ΔT value may additionally depend on the filter parameter signalled through syntax elements of the bitstream;
- ΔT value may be tabulated and provided to the decoder side as a side information; and/or
- ΔT value may be expressed by a list of integer values or through list of integer values which are power of 2.

In other words, filter unit 216 may determine, based on a parameter associated with the block of the video data or a filter parameter associated with the combined SAO and bilateral filter, the delta threshold value. In the above example, the parameter may include one or more of a quantization parameter, a block size, and/or a number of the reference samples included in the block of the video data.

Moreover, filter unit 216 may filter samples $I_a$, $I_c$ as outlined below:

Depending on the SAO classification index (edgeIdx), 1D or 2D dimensional bilateral filter can be applied:

In some instances, filtering can be implemented as bilateral filter process:

$$I'_c = I_C + ((w_a \Delta I_a + w_b \Delta I_b + c_1) >> c_2),$$

where $c_1$ and $c_2$ is system defined integer value.

In some examples, filtering can be implemented through FIR process:

$$I'_c = ((w_a I_a + w_c I_c + w_b I_b + c_1) >> c_2),$$

where $c_1$ and $c_2$ is system defined integer value and weight value $w_c$ is derived: $w_c = 1 - w_a - w_b$ and applying a normalization process.

In some examples, depending on the classification results, a 1D filter of longer tap length can be applied. Example of such 1D filter is shown below:

The directional filters may be defined separately for a horizontal filter $h^{hor}$ and a vertical filter $h^{ver}$, e.g., specified through a fixed mask. The filtering may be restricted to be either applied only along the vertical or along the horizontal direction. The vertical filter may be realized by applying the fixed filter mask, as follows:

$$h_{ver} = (0.5)^4 \begin{pmatrix} 1 \\ 0 \\ 4 \\ 0 \\ 6 \\ 0 \\ 4 \\ 0 \\ 1 \end{pmatrix}$$

The horizontal filter is realized by using the transposed mask $h_{hor} = h_{ver}^t$.

To restate the foregoing, filter unit 216 may obtain an indication of a sample adaptive offset classification index associated with the SAO filter, and select, based on the sample adaptive offset classification index, the BIF as either a one-dimensional bilateral filter or a two-dimensional bilateral filter. That is, filter unit 216 may perform, using the non-linear combined SOA and bilateral filtering engine, bilateral filtering in a way that includes determining, based on two or more reconstructed samples of the current block of video data, the above noted edge index (edgeIdx). In addition, filter unit 216 may invoke the combined SOA and bilateral filtering engine to select, based on the edge index, either a one-dimensional bilateral filter or a two-dimensional bilateral filter as a selected bilateral filter. The combined SOA and bilateral filtering engine may next apply the selected bilateral filter to the reconstructed samples of the current block of video data to obtain the filtered reconstructed samples of the current block of the video data. Moreover, in some examples, the tap-length of the one-dimensional filter may be greater than three (e.g., nine in the last bullet point listed directly above).

In some instances, filter unit 216 may extend the categorization tables to allow for properties of signal in two-dimensions:

In some embodiments, SAO classification process defined in the Table I is extended by combing by employing processing in 2D, non limiting examples are shown below (where grey highlighting denotes changes to existing tables):

TABLE IVI-1

Modified classification of SAO

| Category (edgeIdx) | Condition |
|---|---|
| 0 | c < a && c < b |
| 1 | (c < a && c == b) \|\| (c == a && c < b) |
| 2 | (c > a && c == b) \|\| (c == a && c > b) |
| 3 | c > a && c > b |
| 4 | Function(a, b, c, Horizontal) && Function(a, b, c, Vertical) |
| 5 | None of the above |

TABLE VI-2

Modified classification of SAO

| Category (edgeIdx) | Condition |
|---|---|
| 0 | c < a && c < b |
| 1 | (c < a && c == b) \|\| (c == a && c < b) |
| 2 | (c > a && c == b) \|\| (c == a && c > b) |
| 3 | c > a && c > b |
| 4 | Function(a, b, c, diagonal top-left to right-bottom) && Function(a, b, c, top-right to left-bottom) |
| 5 | None of the above |

In some instances, depending on the classification results, a 2D filter can be applied. Example of such 1D filter is shown in the table below:

TABLE III

Samples used in the weighted sum.

| | $I_A$ | |
|---|---|---|
| $I_L$ | $I_C$ | $I_R$ |
| | $I_B$ | |

The combined SOA and bilateral filtering engine of filter unit 216 may calculate the filtered value, $I_F$, (which may also be denoted as $I'_C$) as a weighted sum of the surrounding delta-intensity values according to the following equation: $I'_C=I_C+((w_A\Delta I_A+w_B\Delta I_B+w_L\Delta I_L+w_R\Delta I_R+c_1)>>c_2)$, where filter unit 216 calculates the deltas as the difference against the center sample, $\Delta I_A=I_A-I_C$ etc. The combined SOA and bilateral filtering engine of filter unit 216 may also calculate the weights as: $w_A=\max(0, m-k*dNL_A)$, where m, k, d, and N are variables (possibly signaled in the bitstream or otherwise derived as set forth in JVET-J0021) and $L_A$ is the luma component (or, in other words, luma value) associated with $I_A$ shown in Table III above.

In some examples, the combined SAO and bilateral filter engine of filter unit 216 may employ a two-dimensional finite impulse response (FIR) filter as follows: $I'_C=I_C+((w_AI_A+w_BI_B+w_LI_L+w_RI_R+w_CI_C+c_1)>>c_2)$, where $w_C=1-w_A-w_B-w_L-w_R$ As such, filter unit 216 may determine that the sample adaptive offset filter as a two-dimensional sample adaptive offset filter. Furthermore, such two-dimensional SAO filtering may occur as a combination (or, in other words, aggregation) of a horizontal SAO filter applied to samples a, c, and b (per the example of FIG. 4A) and vertical SAO filter applied to samples a, c, and b (per the example of FIG. 4B) (as shown in the first instance of table II above—Function (a, b, c, Horizontal) && Function (a, b, c, Vertical)). In addition or as an alternative, such two-dimensional SAO filtering may occur as a combination (or, in other words, aggregation) of a diagonal top-left to bottom right SAO filter applied to samples a, c, and b (per the example of FIG. 4C) and diagonal top-right to bottom-left SAO filter applied to samples a, c, and b (per the example of FIG. 4D) (as shown in the second instance of table II above-Function (a, b, c, diagonal top-left to right-bottom) && Function (a, b, c, top-right to left-bottom)).

Furthermore, per the above, the combined SAO and bilateral filtering engine of filter unit 216 may perform two-dimensional bilateral filtering in which a filtered reconstructed sample of the filtered reconstructed samples is calculated as a weighted sum of deltas of intensity values provided by the reconstructed samples of the current block of the video data. That is, the combined SAO and bilateral filtering engine of filter unit 216 may calculate the filtered value, $I_F$, (which may also be denoted as $I'_C$) as a weighted sum of the surrounding delta-intensity values according to the following equation: $I'_C=I_C+((w_A\Delta I_A+w_B\Delta I_B+w_L\Delta I_L+w_R\Delta I_R+c_1)>>c_2)$, where the combined SAO and bilateral filtering engine of filter unit 216 calculates the deltas as the difference against the center sample, $\Delta I_A=I_A-I_C$ etc. The combined SOA and bilateral filtering engine of filter unit 216 may also calculate the weights as: $w_A=\max(0, m-k*dNL_A)$, where m, k, d, and N are variables (possibly signaled in the bitstream or otherwise derived as set forth in WET-10021) and $L_A$ is the luma component (or, in other words, luma value) associated with $I_A$ shown in Table III above.

Moreover, the combined SAO and bilateral filtering engine of filter unit 216 may apply the bilateral filter as a two-dimensional FIR with respect to the reconstructed samples of the current block of the video data to obtain the filtered reconstructed samples of the current block of the video data. The FIR may be defined according to the above equation, such as $I'_C=I_C+((w_AI_A+w_BI_B+w_LI_L+w_RI_R+w_CI_C+c_1)>>c_2)$, where $w_C=1-w_A-w_B-w_L-w_R$.

The combined SAO and bilateral filtering engine of filter unit 216 may derive an i-th weight, $w_i$, value as follows:
- $w_i$ value is a weight which is derived in a determined process from parameters of CU to which samples a, b and c belong (referring again to the examples of FIGS. 4A-4D). The calculation of the weight values may depend on a QP utilized for coding one or more CUs, one or more block sizes (width and/or length), or a number of samples within a current CU. Additionally, calculation of the weight values may depend on one or more filter parameters signalled through syntax elements of the bitstream (such as those set forth above);
- $w_i$ value may be tabulated and provided to the decoder side as a side information; and/or
- $w_i$ value may be expressed by a list of integer values or through list of integer values which are power of 2

In this respect, filter unit 216 may determine, based on parameter associated with the block of video data or a filter parameter the SAO filter and/or the BIF, a weight for the BIF, and apply, based on the weight and to the reconstructed samples, the adapted BIF to obtain the first filtered samples of the current block of the video data. In the above example, the parameter includes one or more of a quantization parameter, a block size, and a number of the reference samples included in the block of the video data.

Signaling Mechanism:
  In some embodiments, SAO signaling mechanism is modified to include new categorization and processing technique.
  In some embodiments, SAO signaling mechanism is extended to include new categorization and processing technique.

In this way, filter unit 216 may obtain reconstructed samples of the current block of the video data. Filter unit 216 may next invoke the combined SOA and bilateral filtering engine to perform bilateral filtering with respect to the obtained reconstructed samples of the current block of the video data to obtain filtered reconstructed samples of the current block of the video data.

Video encoder 200 represents an example of a device configured to encode video data, the device including a memory configured to store the video data (e.g., decoded picture buffer 218) and one or more processors configured to obtain reconstructed samples of a current block of the video data; and selectively bilaterally filter the reconstructed samples of the current block to generate a filtered current block, wherein selectively bilaterally filtering the reconstructed samples of the current block comprises refraining from bilaterally filtering at least one reconstructed sample of the current block such that the filtered current block includes at least one non-bilaterally filtered sample.

FIG. 5 is a block diagram illustrating an example video decoder 300 that may perform the techniques of this disclosure. Video decoder 300 represents one example of video decoder 30 of FIG. 1, though other examples are possible. FIG. 9 is provided for purposes of explanation and is not limiting on the techniques as broadly exemplified and described in this disclosure. For purposes of explanation, this disclosure describes video decoder 300 is described according to the techniques of JEM and HEVC. However, the techniques of this disclosure may be performed by video coding devices that are configured to other video coding standards.

In the example of FIG. 5, video decoder 300 includes coded picture buffer (CPB) memory 320, entropy decoding unit 302, prediction processing unit 304, inverse quantization unit 306, inverse transform processing unit 308, reconstruction unit 310, filter unit 312, and decoded picture buffer (DPB) 314. Prediction processing unit 304 includes motion compensation unit 316 and intra-prediction unit 318. Prediction processing unit 304 may include addition units to perform prediction in accordance with other prediction modes. As examples, prediction processing unit 304 may include a palette unit, an intra-block copy unit (which may form part of motion compensation unit 316), an affine unit, a linear model (LM) unit, or the like. In other examples, video decoder 300 may include more, fewer, or different functional components.

CPB memory 320 may store video data, such as an encoded video bitstream, to be decoded by the components of video decoder 300. The video data stored in CPB memory 320 may be obtained, for example, from storage media 28 (FIG. 1). CPB memory 320 may include a CPB that stores encoded video data (e.g., syntax elements) from an encoded video bitstream. Also, CPB memory 320 may store video data other than syntax elements of a coded picture, such as temporary data representing outputs from the various units of video decoder 300. DPB 314 generally stores decoded pictures, which video decoder 300 may output and/or use as reference video data when decoding subsequent data or pictures of the encoded video bitstream. CPB memory 320 and DPB 314 may be formed by any of a variety of memory devices, such as dynamic random access memory (DRAM), including synchronous DRAM (SDRAM), magnetoresistive RAM (MRAM), resistive RAM (RRAM), or other types of memory devices. CPB memory 320 and DPB 314 may be provided by the same memory device or separate memory devices. In various examples, CPB memory 320 may be on-chip with other components of video decoder 300, or off-chip relative to those components.

The various units shown in FIG. 5 are illustrated to assist with understanding the operations performed by video decoder 300. The units may be implemented as fixed-function circuits, programmable circuits, or a combination thereof. Similar to FIG. 2, fixed-function circuits refer to circuits that provide particular functionality, and are preset on the operations that can be performed. Programmable circuits refer to circuits that can programmed to perform various tasks, and provide flexible functionality in the operations that can be performed. For instance, programmable circuits may execute software or firmware that cause the programmable circuits to operate in the manner defined by instructions of the software or firmware. Fixed-function circuits may execute software instructions (e.g., to receive parameters or output parameters), but the types of operations that the fixed-function circuits perform are generally immutable. In some examples, the one or more of the units may be distinct circuit blocks (fixed-function or programmable), and in some examples, the one or more units may be integrated circuits.

Video decoder 300 may include ALUs, EFUs, digital circuits, analog circuits, and/or programmable cores formed from programmable circuits. In examples where the operations of video decoder 300 are performed by software executing on the programmable circuits, on-chip or off-chip memory may store instructions (e.g., object code) of the software that video decoder 300 receives and executes.

Entropy decoding unit 302 may receive encoded video data from the CPB and entropy decode the video data to reproduce syntax elements. Prediction processing unit 304, inverse quantization unit 306, inverse transform processing unit 308, reconstruction unit 310, and filter unit 312 may generate decoded video data based on the syntax elements extracted from the bitstream.

In general, video decoder 300 reconstructs a picture on a block-by-block basis. Video decoder 300 may perform a reconstruction operation on each block individually (where the block currently being reconstructed, i.e., decoded, may be referred to as a "current block").

Entropy decoding unit 302 may entropy decode syntax elements defining quantized transform coefficients of a quantized transform coefficient block, as well as transform information, such as a quantization parameter (QP) and/or transform mode indication(s). Inverse quantization unit 306 may use the QP associated with the quantized transform coefficient block to determine a degree of quantization and, likewise, a degree of inverse quantization for inverse quantization unit 306 to apply. Inverse quantization unit 306 may, for example, perform a bitwise left-shift operation to inverse quantize the quantized transform coefficients. Inverse quantization unit 306 may thereby form a transform coefficient block including transform coefficients.

After inverse quantization unit 306 forms the transform coefficient block, inverse transform processing unit 308 may apply one or more inverse transforms to the transform coefficient block to generate a residual block associated with the current block. For example, inverse transform processing unit 308 may apply an inverse DCT, an inverse integer transform, an inverse Karhunen-Loeve transform (KLT), an inverse rotational transform, an inverse directional transform, or another inverse transform to the coefficient block.

Furthermore, prediction processing unit 304 generates a prediction block according to prediction information syntax elements that were entropy decoded by entropy decoding unit 302. For example, if the prediction information syntax elements indicate that the current block is inter-predicted, motion compensation unit 316 may generate the prediction block. In this case, the prediction information syntax elements may indicate a reference picture in DPB 314 from which to retrieve a reference block, as well as a motion vector identifying a location of the reference block in the reference picture relative to the location of the current block in the current picture. Motion compensation unit 316 may generally perform the inter-prediction process in a manner that is substantially similar to that described with respect to motion compensation unit 224 (FIG. 2).

As another example, if the prediction information syntax elements indicate that the current block is intra-predicted, intra-prediction unit 318 may generate the prediction block according to an intra-prediction mode indicated by the prediction information syntax elements. Again, intra-prediction unit 318 may generally perform the intra-prediction process in a manner that is substantially similar to that described with respect to intra-prediction unit 226 (FIG. 2). Intra-prediction unit 318 may retrieve data of neighboring samples to the current block from DPB 314.

Reconstruction unit 310 may reconstruct the current block using the prediction block and the residual block. For example, reconstruction unit 310 may add samples of the residual block to corresponding samples of the prediction block to reconstruct the current block.

Filter unit 312 may perform one or more filter operations on reconstructed blocks. For example, filter unit 312 may perform deblocking operations to reduce blockiness artifacts along edges of the reconstructed blocks. As illustrated by dashed lines, operations of filter unit 312 are not necessarily performed in all examples.

Filter unit 312 may generally perform a filtering process in a matter that is substantially similar to that described with respect to filter unit 216 (FIG. 1). Harmonization of the SAO filtering engine with the BIF may occur by, as one example, removing linear operation from the linear SAO filter set forth in HEVC and elsewhere, as described above, given that both the SAO filter and the BIF (per JVET-J0021) operate in the reconstructed sample domain. As such, the foregoing modifications (set forth with respect to the filter unit 216 discussed with respect to the example of FIG. 2) may allow for the SOA filtering engine of filter unit 312 to implement linear SOA filtering, non-linear SAO filtering, one-dimensional SAO filtering (including of tap lengths greater than three), two-dimensional SAO filtering, and as a result of non-linear SAO filtering, both one-dimensional bilateral filtering and two-dimensional bilateral filtering (including two-dimensional FIR filtering). The modification to the SAO filtering engine may result in what is referred to throughout this disclosure as a combined SAO and bilateral filtering engine.

For example, the combined SAO and bilateral filtering engine of filter unit 312 may determine a delta threshold to which deltas computed between reference samples are compared. The SAO filtering engine of filter unit 312 may determine the delta threshold in a number of difference ways, such as parametrically from parameters of the current sample and neighboring, adjacent, or other reference samples. In some examples, the combined SAO and bilateral filtering engine of filter unit 312 may receive the delta threshold and/or a list of integer values (which may, for example, be a power of two) representative of the delta threshold (and possibly one or more syntax elements identifying which integer value to use for the current block).

The combined SAO and bilateral filtering engine of filter unit 312 may perform bilateral filtering as a result of these harmonizing changes, as the bilateral filter may be non-linear (e.g., two-dimensional rather than one-dimensional, etc.) and operate in the reconstructed sample domain. The combined SAO and bilateral filtering engine of filter unit 312 may perform bilateral filtering with respect to the obtained reconstructed samples of the current block of the video data to obtain filtered reconstructed samples of the current block of the video data. The combined SAO and bilateral filtering engine of filter unit 312 may pass the filtered reconstructed samples to additional in-loop filters, which eventually, after application of any additional filters, is stored to a decoded picture buffer 218.

As such, video decoder 300 may store the reconstructed blocks in DPB 314. For instance, filter unit 312 may store filtered reconstructed blocks in DPB 314. As discussed above, DPB 314 may provide reference information, such as samples of a current picture for intra-prediction and previously decoded pictures for subsequent motion compensation, to prediction processing unit 304. Moreover, video decoder 300 may output decoded pictures from DPB for subsequent presentation on a display device, such as display device 32 of FIG. 1.

Figure 6:
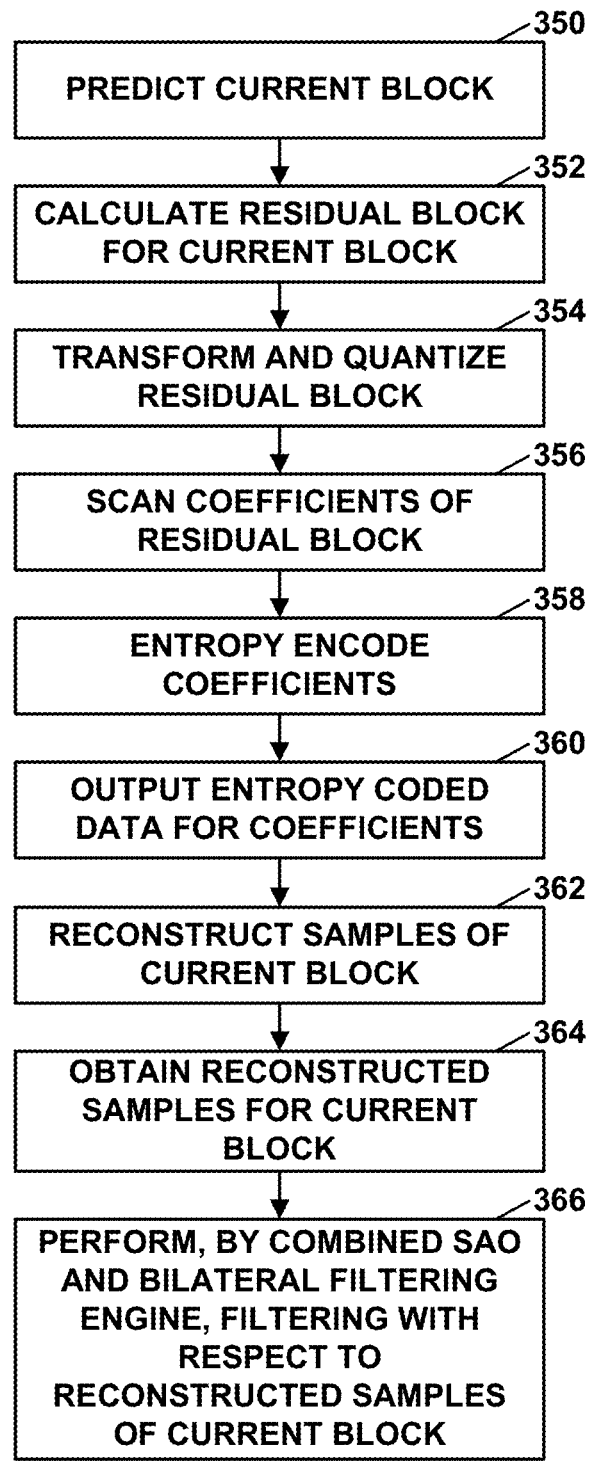
FIG. 6 is a flowchart illustrating example operation for encoding a current block in accordance with various aspects of the techniques described in this disclosure.

FIG. 6 is a flowchart illustrating example operation for encoding a current block in accordance with various aspects of the techniques described in this disclosure. The current block may comprise a current CU. Although described with respect to video encoder 200 (FIGS. 1 and 3), it should be understood that other devices may be configured to perform a method similar to that of FIG. 6.

In this example, video encoder 200 initially predicts the current block (350). For example, video encoder 200 may form a prediction block for the current block. Video encoder 200 may then calculate a residual block for the current block (352). To calculate the residual block, video encoder 200 may calculate a difference between the original, unencoded block and the prediction block for the current block. Video encoder 200 may then transform the residual block and quantize transform coefficients of the residual block (354). Next, video encoder 200 may scan the quantized transform coefficients of the residual block (356). During the scan, or following the scan, video encoder 200 may entropy encode the transform coefficients (358). For example, video encoder 200 may encode the transform coefficients using CAVLC or CABAC. Video encoder 200 may then output the entropy encoded data of the block (360).

In addition, video encoder 200 may reconstruct samples of the current block (362) as described above, and thereby obtain reconstructed samples for the current block (364). Video encoder 200 may next invoke filter unit 216, which may perform, using a combined SAO and bilateral filtering engine, filtering (e.g., SAO and/or bilateral filtering) with respect to the reconstructed samples of the current block (366) to obtain filtered reconstructed samples. Reconstructing, obtaining and filtering (one or more of deblocking, SAO filtering, bilateral filtering, etc.) of the reconstructed samples may be repeated until a filtered frame of video data is output and stored to the decoded picture buffer.

Figure 7:
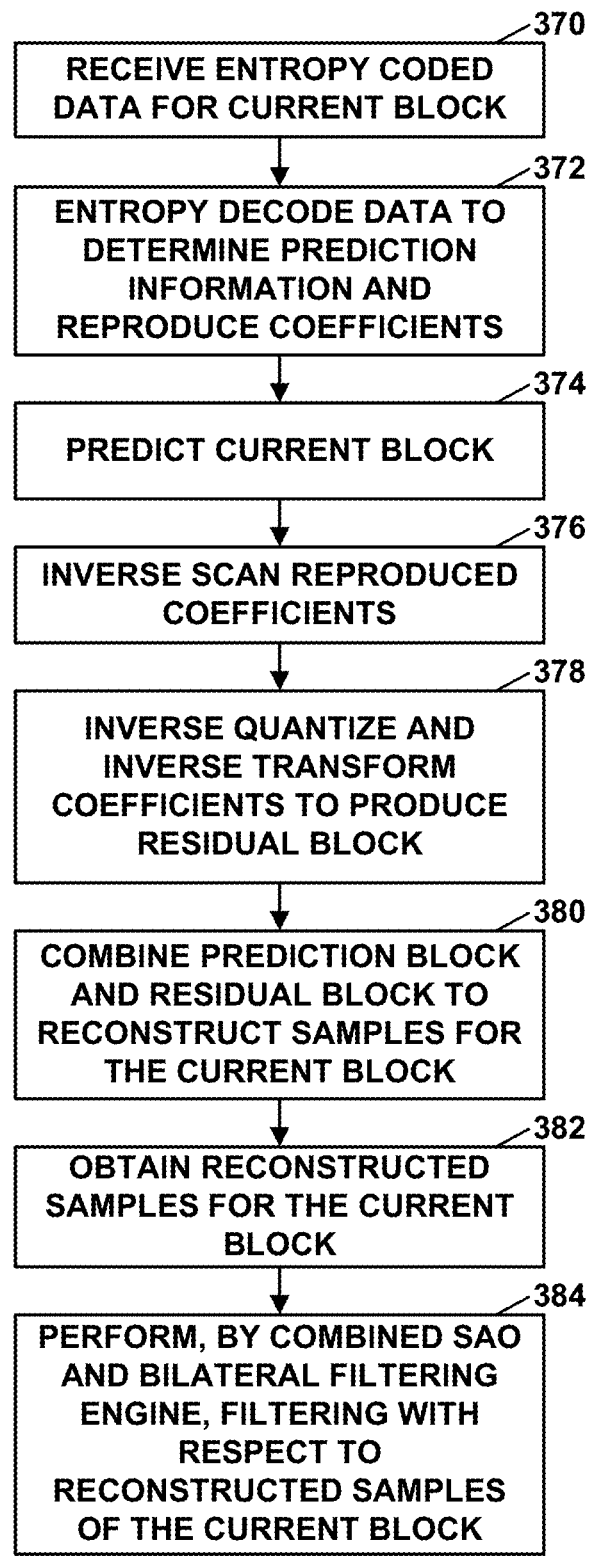
FIG. 7 is a flowchart illustrating example operation for decoding a current block of video data in accordance with various aspects of the techniques described in this disclosure.

FIG. 7 is a flowchart illustrating example operation for decoding a current block of video data in accordance with various aspects of the techniques described in this disclosure. The current block may comprise a current CU. Although described with respect to video decoder 300 (FIGS. 1 and 4), it should be understood that other devices may be configured to perform a method similar to that of FIG. 7.

Video decoder 300 may receive entropy encoded data for the current block, such as entropy encoded prediction information and entropy encoded data for coefficients of a residual block corresponding to the current block (370). Video decoder 300 may entropy decode the entropy encoded data to determine prediction information for the current block and to reproduce coefficients of the residual block (372). Video decoder 300 may predict the current block (374), e.g., using an intra- or inter-prediction mode as indicated by the prediction information for the current block, to calculate a prediction block for the current block. Video decoder 300 may then inverse scan the reproduced coefficients (376), to create a block of quantized transform coefficients. Video decoder 300 may then inverse quantize and inverse transform the transform coefficients to produce a residual block (378). Video decoder 300 may ultimately decode the current block by combining the prediction block and the residual block to reconstruct samples for the current block (380).

As such, video encoder 300 may obtain reconstructed samples for the current block (382). Video encoder 300 may next invoke filter unit 312, which may perform, using a combined SAO and bilateral filtering engine, bilateral filtering with respect to the reconstructed samples of the current block (384) to obtain filtered reconstructed samples. Reconstructing, obtaining and filtering (one or more of deblocking, SAO filtering, bilateral filtering, etc.) of the reconstructed samples may be repeated until a filtered frame of video data is output and stored to the decoded picture buffer.

Certain aspects of this disclosure have been described with respect to the video coding standards for purposes of illustration. However, the techniques described in this disclosure may be useful for other video coding processes, including other standard or proprietary video coding processes not yet developed.

The techniques described above may be performed by video encoder 200 and/or video decoder 300, both of which may be generally referred to as a video coder. Likewise, video coding may refer to video encoding or video decoding, as applicable.

Various aspects of the techniques may enable a devices, methods, and the like to operate as set forth in the following clauses.

Clause 1. A method of filtering a reconstructed block of video data, the method comprising: obtaining, by one or more processors, reconstructed samples of a current block of the video data; and adapting, by the one or more processors and dependent on a parameter associated with a second filter, a first filter; applying, by the one or more processors and to the reconstructed samples, the adapted first filter to obtain first filtered samples of the current block of the video data; and applying, by the one or more processors and to the first filtered samples, the second filter to obtain second filtered samples of the current block of the video data.

Clause 2. The method of clause 1, wherein the first filter includes a bilateral filter.

Clause 3. The method of any combination of clauses 1 and 2, wherein the second filter includes a sample adaptive offset filter.

Clause 4. The method of clause 3, wherein applying the second filter comprises: determining a delta threshold value; determining, based on a current reconstructed sample of the reconstructed samples and a neighboring reconstructed sample of the reconstructed samples, a delta value; applying, when the delta value is less than or equal to the threshold delta value and to the reconstructed samples of the current block of the video data, a first version of the sample adaptive offset filter, to obtain the filtered samples; and applying, when the delta value is greater than the threshold delta value and to the reconstructed samples of the current block of the video data, a second version of the sample adaptive offset filter, to obtain the filtered samples.

Clause 5. The method of any combination of clauses 1-3, wherein applying the second filter comprises: determining a delta threshold value; determining, based on a current reconstructed sample of the reconstructed samples and a neighboring reconstructed sample of the reconstructed samples, a delta value; clipping, based on the delta threshold value, one or more of the neighboring reconstructed samples; and obtaining, based on the clipped one or more neighboring reconstructed samples, the second filtered samples.

Clause 6. The method of any combination of clauses 4 and 5, wherein determining the delta threshold value comprises determining, based on a parameter associated with the block of the video data or a filter parameter associated with the second filter, the delta threshold value.

Clause 7. The method of clause 6, wherein the parameter includes one or more of a quantization parameter, a block size, and a number of the reference samples included in the block of the video data.

Clause 8. The method of any combination of clauses 5-7, wherein adapting the first filter comprises: obtaining an indication of a sample adaptive offset classification index associated with the second filter; selecting, based on the sample adaptive offset classification index, the first filter as either a one-dimensional bilateral filter or a two-dimensional bilateral filter.

Clause 9. The method of any combination of clauses 5-8, wherein the sample adaptive offset filter includes a two-dimensional sample adaptive offset filter.

Clause 10. The method of any combination of clauses 1-9, wherein applying the adapted first filter comprises: determining, based on parameter associated with the block of video data or a filter parameter associated with the second filter, a weight for the first filter; applying, based on the weight and to the reconstructed samples, the adapted first filter to obtain the first filtered samples of the current block of the video data.

Clause 11. The method of clause 10, wherein the parameter includes one or more of a quantization parameter, a block size, and a number of the reference samples included in the block of the video data.

Clause 12. A device for coding video data, the device comprising one or more means for performing the method of any of clauses 1-11.

Clause 13. The device of clause 12, wherein the one or more means comprise one or more processors implemented in circuitry.

Clause 14. The device of any of clauses 12 and 13, further comprising a memory to store the video data.

Clause 15. The device of any of clauses 12-14, further comprising a display configured to display decoded video data.

Clause 16. The device of any of clauses 12-15, wherein the device comprises one or more of a camera, a computer, a mobile device, a broadcast receiver device, or a set-top box.

Clause 17. The device of any of clauses 12-16, wherein the device comprises a video decoder.

Clause 18. The device of any of clauses 12-17, wherein the device comprises a video encoder.

Clause 19. A computer-readable storage medium having stored thereon instructions that, when executed, cause one or more processors to perform the method of any of clauses 1-11.

Clause 20. A device for coding video data, the device comprising: means for obtaining, by one or more processors, reconstructed samples of a current block of the video data; and means for adapting, by the one or more processors and dependent on a parameter associated with a second filter, a first filter; means for applying, by the one or more processors and to the reconstructed samples, the adapted first filter to obtain first filtered samples of the current block of the video data; and means for applying, by the one or more processors and to the first filtered samples, the second filter to obtain second filtered samples of the current block of the video data.

It should be understood that all of the techniques described herein may be used individually or in combination. This disclosure includes several signaling methods which may change depending on certain factors such as block size, palette size, slice type etc. Such variation in signaling or inferring the syntax elements may be known to the encoder and decoder a-priori or may be signaled explicitly in the video parameter set (VPS), sequence parameter set (SPS), picture parameter set (PPS), slice header, at a tile level or elsewhere.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially. In addition, while certain aspects of this disclosure are described as being performed by a single module or unit for purposes of clarity, it should be understood that the techniques of this disclosure may be performed by a combination of units or modules associated with a video coder.

While particular combinations of various aspects of the techniques are described above, these combinations are provided merely to illustrate examples of the techniques described in this disclosure. Accordingly, the techniques of this disclosure should not be limited to these example combinations and may encompass any conceivable combination of the various aspects of the techniques described in this disclosure.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of filtering a reconstructed block of video data, the method comprising:
    obtaining, by one or more processors configured to implement a sample adaptive offset filter, reconstructed samples of a current block of the video data; and
    performing, by a combined sample adaptive offset and bilateral filter, one or more of bilateral filtering and sample adaptive offset filtering with respect to the reconstructed samples of the current block of the video data to obtain filtered reconstructed samples of the current block of the video data;
    wherein performing bilateral filtering includes selecting a bilateral filter from a plurality of bilateral filters based on a difference value between two or more of the reconstructed samples of the current block of the video data.

2. The method of claim 1, wherein performing bilateral filtering comprises:
    applying, when the difference value is less than a difference threshold, a first bilateral filter to the reconstructed samples of the current block of the video data; and
    applying, when the difference value is greater than or equal to the difference threshold, a second bilateral filter to the reconstructed samples of the current block of the video data.

3. The method of claim 2,
    wherein the first bilateral filter comprises a one-dimensional bilateral filter, and
    wherein the second bilateral filter comprises a two-dimensional bilateral filter.

4. The method of claim 1, wherein performing the one or more of bilateral filtering and sample adaptive offset filtering comprises performing, concurrent to performing sample adaptive offset filtering by the combined sample adaptive offset and bilateral filter, bilateral filtering with respect to the reconstructed samples of the current block of the video data to obtain filtered reconstructed samples of the current block of the video data.

5. The method of claim 4, wherein performing the bilateral filtering comprises performing two-dimensional bilateral filtering in which a filtered reconstructed sample of the filtered reconstructed samples is calculated as a weighted sum of deltas of intensity values provided by the reconstructed samples of the current block of the video data.

6. The method of claim 1, wherein performing the one or more of bilateral filtering and sample adaptive offset filtering comprises:
    determining, based on two or more reconstructed samples of the current block of video data, an edge index;
    selecting, based on the edge index, either a one-dimensional bilateral filter or a two-dimensional bilateral filter as a selected bilateral filter; and applying, by the combined sample adaptive offset and bilateral filter, the selected bilateral filter to the reconstructed samples of the current block of the video data to obtain the filtered reconstructed samples of the current block of the video data.

7. The method of claim 6, wherein applying the selected bilateral filter comprises:
determining a weight based on a value of at least one of the reconstructed samples of the current block of the video data; and
applying the weight to a neighboring reconstructed sample to obtain a current filtered reconstructed sample of the filtered reconstructed samples of the current block of the video data.

8. The method of claim 7, wherein applying the selected bilateral filter comprises performing a two-dimensional finite impulse response filtering with respect to the reconstructed samples of the current block of the video data to obtain the filtered reconstructed samples of the current block of the video data.

9. The method of claim 7, wherein applying the selected bilateral filter comprises:
determining, based on a parameter for the current block of the video data, a weight;
applying the weight to a neighboring reconstructed sample to obtain a current filtered reconstructed sample of the filtered reconstructed samples of the current block of the video data.

10. The method of claim 1, wherein performing the one or more of bilateral filtering and sample adaptive offset filtering comprises:
performing either sample adaptive offset filtering or bilateral filtering with respect to the reconstructed samples of the current block of the video data to obtain intermediately filtered reconstructed samples of the current block of the video data; and
performing either bilateral filtering or sample adaptive offset filtering with respect to the intermediately filtered reconstructed samples of the current block of the video data to obtain the filtered reconstructed samples of the current block of the video data.

11. A device for coding video data, the device comprising:
a memory to store the video data; and
one or more processors implemented in circuitry, the one or more processors configured to implement a combined sample adaptive offset and bilateral filter, the combined sample adaptive offset and bilateral filter configured to:
obtain reconstructed samples of a current block of the video data; and
perform one or more of bilateral filtering and sample adaptive offset filtering with respect to the reconstructed samples of the current block of the video data to obtain filtered reconstructed samples of the current block of the video data;
wherein performing bilateral filtering includes selecting a bilateral filter from a plurality of bilateral filters based on a difference value between two or more of the reconstructed samples of the current block of the video data.

12. The device of claim 11, wherein the combined sample adaptive offset and bilateral filter is configured to:
apply, when the difference value is less than a difference threshold, a first bilateral filter to the reconstructed samples of the current block of the video data; and
apply, when the difference value is greater than or equal to the difference threshold, a second bilateral filter to the reconstructed samples of the current block of the video data.

13. The device of claim 12,
wherein the first bilateral filter comprises a one-dimensional bilateral filter, and
wherein the second bilateral filter comprises a two-dimensional bilateral filter.

14. The device of claim 11, wherein the combined sample adaptive offset and bilateral filter is configured to perform, concurrent to performing sample adaptive offset filtering by the combined sample adaptive offset and bilateral filter, bilateral filtering with respect to the reconstructed samples of the current block of the video data to obtain filtered reconstructed samples of the current block of the video data.

15. The device of claim 14, wherein the combined sample adaptive offset and bilateral filter is configured to perform two-dimensional bilateral filtering in which a filtered reconstructed sample of the filtered reconstructed samples is calculated as a weighted sum of deltas of intensity values provided by the reconstructed samples of the current block of the video data.

16. The device of claim 11, wherein the combined sample adaptive offset and bilateral filter is configured to:
determine, based on two or more reconstructed samples of the current block of video data, an edge index;
select, based on the edge index, either a one-dimensional bilateral filter or a two-dimensional bilateral filter as a selected bilateral filter; and
apply the selected bilateral filter to the reconstructed samples of the current block of the video data to obtain the filtered reconstructed samples of the current block of the video data.

17. The device of claim 16, wherein the combined sample adaptive offset and bilateral filter is configured to:
determine a weight based on a value of at least one of the reconstructed samples of the current block of the video data; and
apply the weight to a neighboring reconstructed sample to obtain a current filtered reconstructed sample of the filtered reconstructed samples of the current block of the video data.

18. The device of claim 17, wherein the combined sample adaptive offset and bilateral filter is configured to perform a two-dimensional finite impulse response filtering with respect to the reconstructed samples of the current block of the video data to obtain the filtered reconstructed samples of the current block of the video data.

19. The device of claim 17, wherein the combined sample adaptive offset and bilateral filter is configured to:
determine, based on a parameter for the current block of the video data, a weight; and
apply the weight to a neighboring reconstructed sample to obtain a current filtered reconstructed sample of the filtered reconstructed samples of the current block of the video data.

20. The device of claim 11, wherein the combined sample adaptive offset and bilateral filter is configured to:
perform either sample adaptive offset filtering or bilateral filtering with respect to the reconstructed samples of the current block of the video data to obtain intermediately filtered reconstructed samples of the current block of the video data; and
perform either bilateral filtering or sample adaptive offset filtering with respect to the intermediately filtered reconstructed samples of the current block of the video data to obtain the filtered reconstructed samples of the current block of the video data.

21. The device of claim 11, further comprising a display configured to display at least the filtered reconstructed samples of the current block of the video data.

22. The device of claim 11, wherein the device comprises one or more of a camera, a computer, a mobile device, a broadcast receiver device, or a set-top box.

23. The device of claim 11, wherein the device comprises a video decoder.

24. The device of claim 11, wherein the device comprises a video encoder.

25. A computer-readable storage medium having stored thereon instructions that, when executed, cause one or more processors to implement a combined sample adaptive offset and bilateral filter, wherein the combined sample adaptive offset and bilateral filter is configured to:
  obtain reconstructed samples of a current block of video data; and
  perform one or more of bilateral filtering and sample adaptive offset filtering with respect to the reconstructed samples of the current block of the video data to obtain filtered reconstructed samples of the current block of the video data;
  wherein performing bilateral filtering includes selecting a bilateral filter from a plurality of bilateral filters based on a difference value between two or more of the reconstructed samples of the current block of the video data.

26. A device for coding video data, the device comprising:
  means for implementing a combined sample adaptive offset and bilateral filter, wherein the means for implementing the sample adaptive offset and bilateral filter comprises:
  means for obtaining reconstructed samples of a current block of the video data; and
  means for performing one or more of bilateral filtering and sample adaptive offset filtering with respect to the reconstructed samples of the current block of the video data to obtain filtered reconstructed samples of the current block of the video data;
  wherein the means for performing bilateral filtering includes means for selecting a bilateral filter from a plurality of bilateral filters based on a difference value between two or more of the reconstructed samples of the current block of the video data.

* * * * *